(12) United States Patent
Venkataramani et al.

(10) Patent No.: US 12,293,225 B2
(45) Date of Patent: May 6, 2025

(54) LOCKLESS HANDLING OF BUFFERS FOR REMOTE DIRECT MEMORY ACCESS (RDMA) I/O OPERATIONS

(71) Applicant: Nutanix, Inc., San Jose, CA (US)

(72) Inventors: Hema Venkataramani, San Jose, CA (US); Alok Nemchand Kataria, Pune (IN); Rohit Jain, Cupertino, CA (US)

(73) Assignee: Nutanix, Inc., San Jose, CA (US)

( * ) Notice: Subject to any disclaimer, the term of this patent is extended or adjusted under 35 U.S.C. 154(b) by 17 days.

(21) Appl. No.: 17/139,698

(22) Filed: Dec. 31, 2020

(65) Prior Publication Data

US 2022/0206852 A1    Jun. 30, 2022

(51) Int. Cl.
*G06F 9/50*    (2006.01)
*G06F 9/48*    (2006.01)
(Continued)

(52) U.S. Cl.
CPC .......... *G06F 9/5016* (2013.01); *G06F 9/4881* (2013.01); *G06F 9/52* (2013.01);
(Continued)

(58) Field of Classification Search
None
See application file for complete search history.

(56) References Cited

U.S. PATENT DOCUMENTS

| | | | |
|---|---|---|---|
| 7,975,260 B1 * | 7/2011 | Conover | G06F 11/362 717/124 |
| 8,131,814 B1 * | 3/2012 | Schlansker | G06F 13/28 709/212 |

(Continued)

FOREIGN PATENT DOCUMENTS

| | | |
|---|---|---|
| CN | 102571925 B | 8/2014 |
| WO | WO 2020155417 A1 | 8/2020 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Abu Zar Ghaffari
(74) *Attorney, Agent, or Firm* — Vista IP Law Group, LLP

(57) ABSTRACT

Methods, systems and computer program products for lockless acquisition of memory for RDMA operations. A contiguous physical memory region is allocated. The contiguous physical memory region is divided into a plurality of preregistered chunks that are assigned to one or more process threads that are associated with an RDMA NIC. When responding to a request from a particular one of the one or more process threads, a buffer carved from the preregistered chunk of the contiguous physical memory region is assigned to the requesting process thread. Since the memory is pre-registered, and since the associations are made at the thread level, there is no need for locks when acquiring a buffer. Furthermore, since the memory is pre-registered, the threads do not incur registration latency. The contiguous physical memory region can be a contiguous HugePage contiguous region from which a plurality of individually allocatable buffers can be assigned to different threads.

24 Claims, 15 Drawing Sheets

(51) Int. Cl.
   *G06F 9/52* (2006.01)
   *G06F 9/54* (2006.01)
   *G06F 12/02* (2006.01)
   *G06F 15/173* (2006.01)

(52) U.S. Cl.
   CPC .......... *G06F 9/544* (2013.01); *G06F 12/0238* (2013.01); *G06F 12/0292* (2013.01); *G06F 15/17331* (2013.01); *G06F 9/5022* (2013.01); *G06F 12/023* (2013.01); *G06F 2209/5011* (2013.01)

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 9,665,534 | B2 | 5/2017 | Tsirkin |
| 9,772,866 | B1 | 9/2017 | Aron et al. |
| 9,953,006 | B2* | 4/2018 | Amit .................. H04L 67/1029 |
| 10,824,369 | B2 | 11/2020 | Venkataramani et al. |
| 11,086,524 | B1* | 8/2021 | Sun ........................ G06F 3/0659 |
| 11,150,962 | B2* | 10/2021 | Niles .................... G06F 12/0238 |
| 2002/0073257 | A1 | 6/2002 | Beukema et al. |
| 2004/0093389 | A1* | 5/2004 | Mohamed ............. H04L 69/329 709/212 |
| 2006/0045098 | A1 | 3/2006 | Krause |
| 2006/0047771 | A1* | 3/2006 | Blackmore ............. H04L 67/12 709/209 |
| 2007/0288828 | A1* | 12/2007 | Biran .................. H03M 13/091 714/758 |
| 2010/0083247 | A1 | 4/2010 | Kanevsky et al. |
| 2010/0161879 | A1 | 6/2010 | Nation et al. |
| 2011/0029730 | A1* | 2/2011 | Durocher ............ G06F 12/0866 711/E12.001 |
| 2011/0119665 | A1 | 5/2011 | Santos et al. |
| 2012/0210066 | A1 | 8/2012 | Joshi et al. |
| 2012/0278295 | A1 | 11/2012 | Hildebrand et al. |
| 2013/0151646 | A1* | 6/2013 | Chidambaram .... H04L 49/9094 709/213 |
| 2014/0337456 | A1 | 11/2014 | Chawla et al. |
| 2015/0039846 | A1 | 2/2015 | Simon et al. |
| 2015/0186330 | A1* | 7/2015 | Gao .................... H04L 67/1097 709/213 |
| 2016/0072906 | A1* | 3/2016 | Shuler .................... H04L 67/55 709/206 |
| 2016/0077997 | A1* | 3/2016 | Froese .................... H04L 45/02 709/212 |
| 2016/0267051 | A1* | 9/2016 | Metzler ............. G06F 15/17331 |
| 2016/0299856 | A1 | 10/2016 | Fruchter et al. |
| 2016/0350260 | A1* | 12/2016 | Tsirkin ................ G06F 9/45558 |
| 2016/0350261 | A1* | 12/2016 | Tsirkin .............. G06F 15/17331 |
| 2017/0075856 | A1* | 3/2017 | Suzue ................. H04L 67/1001 |
| 2017/0149890 | A1* | 5/2017 | Shamis .............. H04L 67/1097 |
| 2017/0199842 | A1 | 7/2017 | England et al. |
| 2018/0032249 | A1 | 2/2018 | Makhervaks et al. |
| 2018/0335956 | A1 | 11/2018 | Iyer et al. |
| 2018/0349260 | A1* | 12/2018 | Kurmus ................ G06F 12/023 |
| 2019/0095616 | A1* | 3/2019 | Drapeau ............... G06F 21/566 |
| 2019/0124395 | A1 | 4/2019 | Lin |
| 2019/0129845 | A1* | 5/2019 | Gidra .................. G06F 12/0253 |
| 2020/0236089 | A1 | 7/2020 | Li et al. |
| 2020/0244521 | A1 | 7/2020 | Patel et al. |
| 2020/0326971 | A1 | 10/2020 | Yang |
| 2020/0364100 | A1* | 11/2020 | Shah ...................... G06F 3/0673 |
| 2020/0401440 | A1* | 12/2020 | Sankaran ............. G06F 9/3887 |
| 2021/0073198 | A1* | 3/2021 | Srinivasan .......... G06F 11/1471 |
| 2021/0081352 | A1 | 3/2021 | Yang et al. |
| 2021/0103403 | A1 | 4/2021 | He et al. |
| 2021/0191777 | A1* | 6/2021 | Roozbeh ............. G06F 12/0864 |
| 2021/0349820 | A1* | 11/2021 | Kutch ................. G06F 12/0802 |
| 2022/0156116 | A1 | 5/2022 | Yardeni et al. |
| 2022/0232074 | A1 | 7/2022 | Scaglione et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jan. 30, 2021), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

Wooddall, T. et al., "High Performance RDMA Protocols in HPC", Conference: *Proceedings of the 13th European PVM/MPI*, (Sep. 2006).

Viviano, A. et al., "Caching Registered Memory", Microsoft Docs, (Apr. 20, 2017).

Wyckoff, P. et al., "Memory Registration Caching Correctness", *CCGrid 2005. IEEE International Symposium on Cluster Computing and the Grid, 2005*, (May 9-12, 2005).

Li, F. et al., "Accelerating Relational Databases by Leveraging Remote Memory and RDMA", *SIGMOD'16*, (Jun. 26-Jul. 1, 2016).

Li, D. et al., "Scalable Memory Registration for High Performance Networks Using Helper Threads", *Proceedings of the 8th ACM International Conference on Computing Frontiers (CF)*, (May 3-5, 2011).

Ko, M. et al., "iSCSI Extensions for RDMA Specification (Version 1.0)", (Jul. 2003).

Liu, J. et al., "Evaluating the Impact of RDMA on Storage I/O over InfiniBand", Published 2004.

Metzler, B., "A Hybrid I/O Virtualization Framework for RDMA-capable Network Interfaces", VEE '15, (Mar. 2015).

"Configuring Mellanox Rdma I/O Drivers for ESXi 5.x (Partner Verified and Support) (2058261)", Vmware Customer Connect, (Jan. 29, 2014). URL: https://kb.vmware.com/s/article/2058261.

Non-Final Office Action dated Oct. 4, 2021 for related U.S. Appl. No. 17/163,031.

Notice of Allowance for U.S. Appl. No. 17/163,031 dated Apr. 20, 2022.

Non-Final Office Action dated Oct. 5, 2022 for U.S. Appl. No. 17/163,210.

Poitras, Steven. "The Nutanix Bible" (Sep. 9, 2022), from https://nutanixbible.com/ (Publication date based on indicated capture date by Archive.org; first publication date unknown).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

(56) References Cited

OTHER PUBLICATIONS

Final Office Action dated Mar. 27, 2023 for U.S. Appl. No. 17/163,210.

MacArthur, Patrick. Userspace RDMA Verbs on Commodity Hardware using D P D K. [online] IEEE., pp. 1 03-11 0. Retrieved From the Internet <https://ieeexplore.ieee org/stamp/stamp.jsp?arnumber= 8071063> (Year: 2017).

Non-Final Office Action for U.S. Appl. No. 17/163,210 dated Oct. 5, 2023.

"Configure iSER with ESXi," VMWare Docs, URL: https://docs.vmware.com/en/VMware-vSphere/7.0/com.vmware.vsphere.storage.doc/GUID-679D1419-BF9D-4E10-8598-F23205E8AB0F.html, dated Jul. 23, 2020.

"Enable the VMware iSER Adapter," VMWare Docs, URL: https://docs.vmware.com/en/VMware-vSphere/6.7/com.vmware.vsphere.storage.doc/GUID-4F2C10BB-3705-4040-BFDE-A190FE273060.html, dated May 31, 2019.

Brodeur, J., "vSphere with iSER—How to release the full potential of your iSCSI storage!," VMWare—VROOM! Performance Blog, dated Aug. 27, 2018.

"Using iSER Protocol with ESXi," VMWare Docs, URL: https://docs.vmware.com/en/VMware-vSphere/7.0/com.vmware.vsphere.storage.doc/GUID-2B5FDE0F-3B76-408D-A64D-730B70BCA0A0.html#GUID-2B5FDE0F-3B76-408D-A64D-730B70BCA0A0, dated Jul. 22, 2020.

"Network Requirements for RDMA over Converged Ethernet," VMWare Docs, URL: https://docs.vmware.com/en/VMware-vSphere/6.7/com.vmware.vsphere.networking.doc/GUID-E4ECDD76-75D6-4974-A225-04D5D117A9CF.html, dated May 31, 2019.

"VMware vSAN Design Guide," URL: https://web.archive.org/web/20201106104438/https://core.vmware.com/resource/vmware-vsan-design-guide#sec2-sub5, date found via Internet Archive as Nov. 6, 2020.

"Cisco UCS Manager Configuration Guide for RDMA over Converged Ethernet (RoCE) Version 2, Release 4.1," Cisco, dated Dec. 14, 2020.

Michael, M., "Scalable Lock-Free Dynamic Memory Allocation," PLDI'04, Jun. 9-11, 2004, Washington, DC, USA, dated 2004.

Notice of Allowance for U.S. Appl. No. 17/163,210 dated Apr. 15, 2024.

Notice of Allowance for U.S. Appl. No. 17/163,210 dated Sep. 12, 2024.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 31, 2021), from https://nutanixbible.com/ (Publication date based on indicated capture date by Archive.org; first publication date unknown).

* cited by examiner

300

| Approach | Charasteristic1 | Charasteristic2 |
|---|---|---|
| Preregister the entire process address space | Only one preregistration event | Leads to over-provisioning (or under-provisioning) of memory |
| Statically associate preregistered chunks of memory to process threads in advance of RDMA I/O | Threads do not ever share preregistered memory portions so no locking is needed | Relies on accurate correspondence of the associations with respect to future I/O |
| Maintain a pool of preregistered chunks from which to draw buffers on demand | Buffers can be allocated dynamically based on a size demand expressed in a request | Released buffers can be reused without a lock, and multiple contiguous released buffers can be coalesced |

FIG. 3

LOCKLESS HANDLING OF BUFFERS FOR REMOTE DIRECT MEMORY ACCESS (RDMA) I/O OPERATIONS

TECHNICAL FIELD

This disclosure relates to deployment of remote direct memory access (RDMA) network interface cards (NICs), and more particularly to techniques for lockless handling of buffers for remote direct memory access (RDMA) I/O operations.

BACKGROUND

Remote direct memory access (RDMA) is a fast path network transport protocol that enables zero-copy memory-to-memory transfers. RDMA NICs avoid context switches for packet transfers/receives. To be able to send data over RDMA, source and/or target physical memory locations need to be registered with a particular remote direct memory access (RDMA) network interface card (NIC). The RDMA NIC, possibly in combination with its driver software, will perform translation of virtual memory addresses to physical memory addresses. This registration is a costly operation (consuming a few hundred microseconds on average even for small buffer sizes). While it is necessary to perform such registration, it is desired to avoid the cost of registration when doing I/O (input/output or IO). This is especially true when the number of I/O operations is very high. That is, lots of I/O operations correlate to lots of registrations, with each registration incurring the aforementioned costs.

Locking is needed for maintaining a free lists of buffers, which locks must be used to facilitate safe reuse of the buffers when multiple processes are involved.

Unfortunately, there are certain situations where the I/O-performing actors of the system (e.g., virtual machines) raise a large number of I/O operations (e.g., a large number of packets to be sent/received) and, as such, the latency penalty incurred by lock acquisition and release negatively impacts system performance. Additionally, a workload pattern that includes small I/O operation sizes and/or high I/O operation counts often leads to higher than desired CPU consumption. Therefore, what is needed is a technique or techniques that address technical problems associated with memory management of an RDMA buffer pool.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for lockless handling of buffers for remote direct memory access (RDMA) I/O operations, which techniques advance the relevant technologies to address technological issues with legacy approaches. More specifically, the present disclosure describes techniques used in systems, methods, and in computer program products for allocation and caching of preregistered memory regions for use in RDMA I/O operations. Certain embodiments are directed to technological solutions for maintaining a global pool of pre-registered RDMA buffers from which individual threads can locklessly obtain memory buffers for RDMA transfers.

The disclosed embodiments modify and improve over legacy approaches. In particular, the herein-disclosed techniques provide technical solutions that address the technical problem of system performance degradation that is attributable to lock acquisition and release over constituents of an RDMA buffer pool.

Many of the herein-disclosed embodiments for locklessly obtaining memory buffers for RDMA transfers are technological solutions pertaining to technological problems that arise in the hardware and software arts that underlie computer virtualization systems. Aspects of the present disclosure achieve performance and other improvements in peripheral technical fields including, but not limited to, high performance computing and distributed storage systems.

Some embodiments include a sequence of instructions that are stored on a non-transitory computer readable medium. Such a sequence of instructions, when stored in memory and executed by one or more processors, causes the one or more processors to perform a set of acts for maintaining a global pool of pre-registered RDMA buffers from which individual threads can locklessly obtain memory buffers for RDMA transfers.

Some embodiments include the aforementioned sequence of instructions that are stored in a memory, which memory is interfaced to one or more processors such that the one or more processors can execute the sequence of instructions to cause the one or more processors to implement acts for maintaining a global pool of pre-registered RDMA buffers from which individual threads can locklessly obtain memory buffers for RDMA transfers.

In various embodiments, any combinations of any of the above can be organized to perform any variation of acts for allocation and caching of preregistered memory regions for use in RDMA I/O operations, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 3 illustrates several alternative memory preregistration techniques that facilitate lockless allocation of buffers to worker threads, according to an embodiment.

DETAILED DESCRIPTION

Figure 1A:
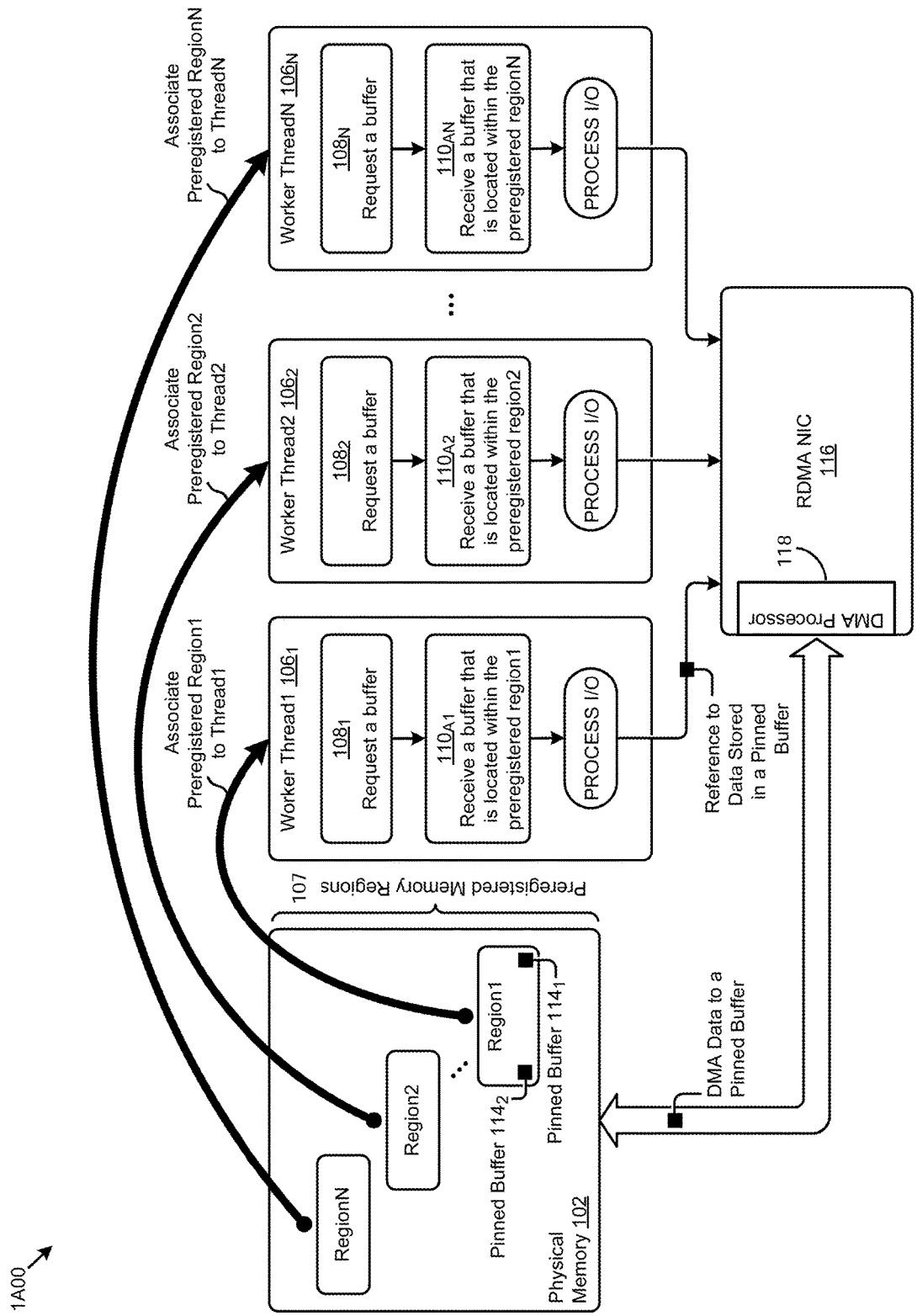
FIG. 1A and FIG. 1B exemplify environments in which embodiments of the disclosure can be performed.

Aspects of the present disclosure solve problems associated with using computer systems for reducing system performance degradation attributable to lock acquisition and lock release over constituents of a remote direct memory access (RDMA) buffer pool. Some embodiments are directed to approaches for maintaining a global pool of preregistered RDMA buffers from which individual threads can locklessly obtain memory buffers for RDMA transfers. The accompanying figures and discussions herein present example environments, systems, methods, and computer program products for allocation and caching of preregistered memory regions for use in RDMA I/O (input/output or IO) operations.

Overview

Various approaches for locklessly allocating preregistered memory to processes that invoke RDMA I/O are disclosed. Specifically, a static mode divides preregistered chunks statically among a set of process threads, whereas a dynamic mode implements a global chunk pool of preregistered memory from which individual threads can request chunks for their respective RDMA transfers.

Both of the above approaches manage a tracking data structure to ensure that any memory that is currently in use by the threads do not overlap across the threads. When non-overlapping chunks of memory are assigned to or otherwise associated with their respective threads, the threads do not have to acquire a lock prior to using the memory. This is because, even when the underlying operating system implements pre-emptive, interrupt-driven scheduling of threads, since the non-overlapping chunks of memory are assigned to or otherwise associated with respective specific threads, there is no risk that a particular chunk of memory or portion thereof can be allocated to a different thread.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Descriptions of Example Embodiments

FIG. 1A exemplifies a system 1A00 in which preregistered memory regions are statically pre-assigned to worker threads prior to their invocation of RDMA I/O operations. As an option, one or more variations of system 1A00 or any aspect thereof may be implemented in the context of the architecture and functionality of the embodiments described herein and/or in any environment.

System 1A00 is configured to implement lockless registration of memory for an RDMA operation. As shown, physical memory 102 is allocated from system memory. The allocated memory can be allocated in one allocation call and thereafter divided into multiple regions (e.g., region1, region2, . . . , regionN), or multiple allocation calls can be issued, one allocation call per region. The foregoing system memory allocation call can be performed by any operational element of the system, including system initialization code, or remote direct memory access (RDMA) network interface card (NIC) driver code, or virtualization system code, or any code that can allocate contiguous physical memory regions from system memory.

In this embodiment, in which a static pre-assignment of memory to worker threads is implemented, there are three non-overlapping memory regions that are associated with three separate worker threads (e.g., worker thread1, worker thread2, worker threadN). This is shown by the bold arrows that associate a particular non-overlapping memory region to a particular worker thread. More specifically, and as shown, a first static pre-assignment serves to associate preregistered region1 to thread1, a second static pre-assignment serves to associate preregistered region2 to thread2, and an Nth static pre-assignment serves to associate preregistered regionN to threadN.

Once the associations have been accomplished, each non-overlapping memory region can be registered with the RDMA NIC 116 such that the RDMA NIC DMA processor 118 can perform direct memory access operations to/from the physical memory corresponding to the shown preregistered memory regions 107.

The direct memory access operations to/from the preregistered memory regions can comprise READs and/or WRITEs in any order and for any size. In some cases the size of the data is relatively small, whereas the allocated contiguous physical memory regions are relatively large. As such, the allocated contiguous physical memory regions can be divided into a plurality of chunks. Since each entire allocated contiguous physical memory region is preregistered and pre-assigned respective process threads, each thread is able to issue I/O commands to the RDMA NIC, where the I/O commands refer to some address range within the preregistered memory (e.g., with reference to data stored in pinned buffer $114_1$ or with reference to data stored in pinned buffer $114_2$).

As used herein, the term pinned buffer refers to a virtual memory location that is not swapped out. More specifically, the address range of a pinned buffer is backed by an address range of physical memory that is accessible to an RDMA NIC DMA processor.

When processing RDMA I/Os, each thread can operate asynchronously with respect to any other thread. Strictly as an example, when a requestor (e.g., worker thread $106_1$) needs a buffer (e.g., of a particular size), the request (step $108_1$) can be satisfied by allocating at least a portion (e.g., a portion of at least the requested size) of the preregistered memory region1, and providing the address bounds of the requested buffer (e.g., at step $110_{A1}$) to the requesting thread (e.g., worker thread $106_1$), after which the thread can process the RDMA I/O. Any/all of the foregoing steps can be carried out at the same time that worker thread2 $106_2, \ldots$, worker threadN $106_N$ are requesting respective buffers (e.g., at step $108_2, \ldots$, step $108_N$) that are satisfied (e.g., at step $110_{A2}, \ldots$, step $110_{AN}$) with buffers drawn from preregistered memory region2, . . . , regionN, respectively.

In accordance with the foregoing, any process thread that requests a buffer can be allocated a corresponding buffer carved from that thread's associated preregistered chunk. No lock is required and, as such, neither the registration of the buffer nor any locking is needed in the fast path.

For illustrative purposes, the examples herein refer to threads, however a requestor may be any processing entity that can execute on a processor. As examples, and not as limitations, such processing entities can be any of, a computing process, a hypervisor, a virtual machine, a controller, a task, a script, a sequence of computer code instructions, or any other computing object that executes in the context of a host operating system or in the context of a guest operating system.

Static Versus Dynamic Associations

It is desirable to be able to preregister memory for use in RDMA operations before RDMA I/Os commence (i.e., so that registration activities are performed out of the fast path of RDMA I/Os). While a static approach is intuitively satisfying, the static approach is oversimplified in that it fails to account for the dynamic nature of workloads. Preregistration of memory before RDMA I/Os commence runs the risk of either over-provisioning memory or under-provisioning memory. This is because preregistration of "pinned" memory prior to carrying out the workload would necessarily make some assumptions as to the workload characteristics.

To illustrate, one characteristic of establishing static associations between preregistered memory and threads before the threads begin RDMA I/O is that the memory regions might be mis-sized (i.e., due to being statically established before beginning RDMA I/O). For example, it might be that worker thread1 implements a workload where only small and infrequent RDMA I/Os are carried out, while worker thread2 might implement a workload where really large RDMA I/Os are carried out. It can also happen that worker threadN might initially implement a workload where RDMA I/Os are carried out in a first time period, and then never again. Thus, establishing static associations between preregistered memory and threads before the threads begin RDMA I/O can lead to over-allocation or under-allocation of memory to the threads. To avoid the over-allocation or under-allocation of memory to the threads, what is needed is a mechanism that dynamically establishes associations between preregistered memory and threads, based on ongoing temporal characteristics of the I/O command pattern and/or based on ongoing size characteristics of the I/O commands.

Figure 1B:
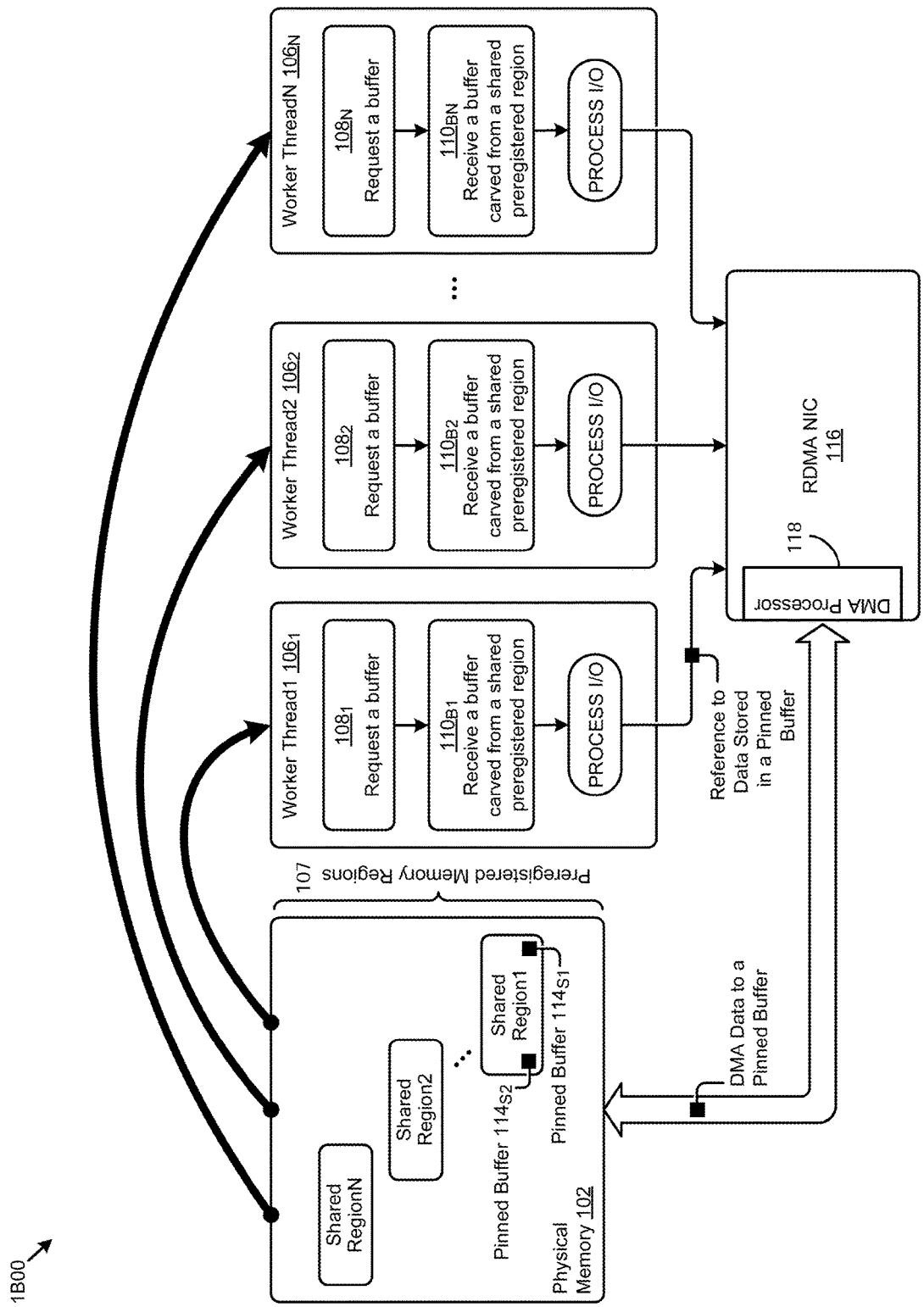

FIG. 1B exemplifies a system 1B00 in which buffers carved from preregistered memory regions are dynamically assigned to worker threads based on based on ongoing temporal and/or ongoing size characteristics of the I/O commands. As an option, one or more variations of system 100 or any aspect thereof may be implemented in the context of the architecture and functionality of the embodiments described herein and/or in any environment.

As shown, the preregistered memory regions 107 of FIG. 1B include non-overlapping shared regions (e.g., shared region1, shared region2, . . . , shared regionN). The regions are shared in the sense that different pinned buffers (e.g., pinned buffer $114_{S1}$ and pinned buffer $114_{S2}$) that occur in one particular region of preregistered memory can be associated with different threads. This sharing can be administrated by dividing a particular shared region into a plurality of preregistered chunks that are dynamically assigned to one or more process threads that are associated with an RDMA NIC. More particularly, the shared regions (e.g., 1 GB in size, 2 GB in size, 4 GB in size, etc.) can be divided into chunks (e.g., 2 MB in size) and these chunks can be preregistered with the RDMA NIC. So long as the chunks are registered with the RDMA NIC prior to initiation of an RDMA I/O to/from that chunk, and so long as there is some mechanism to safely allocate a portion of the preregistered memory to a particular thread, buffers can be carved out of the preregistered chunks on demand. In this case, a thread can receive a buffer carved from a shared preregistered region. This is shown by step $110_{B1}$, step $110_{B2}$, and step $110_{BN}$.

Moreover, when a buffer that is carved from a shared region is released by the particular thread to which the buffer had been allocated, then that buffer can be marked as available and subsequently reused by the same or different thread. In some situations, a released buffer can be coalesced with other available buffers and made available for allocation to the same or different thread. As an example, when all buffers from a particular chunk have been released (e.g., released by the thread to which the chunk was originally-assigned), the chunk can be re-assigned to a different thread (e.g., to a thread other than the thread to which the chunk was originally-assigned).

In situations where a particular thread uses a buffer or series of buffers of a small size, then releases them while requesting a larger buffer, it can happen that the request for the larger buffer can be satisfied locklessly. This can happen when one buffer that had been assigned to a particular thread is coalesced with other available buffers (e.g., contiguous available buffers) that had been assigned to the same particular thread. As such, even when a given thread has a dynamically-varying acquire/release pattern and/or even when a given thread has a dynamically-varying buffer size request pattern, the thread can locklessly acquire buffers of varying sizes.

The foregoing implementations use preregistered chunks for containing outgoing RDMA data. Additionally or alternatively, a transport layer actor can copy data from an unregistered buffer location (e.g., from memory space of a process) into preregistered chunks of a chunk pool so that the DMA transfer can happen from the preregistered memory chunk.

Figure 2A:
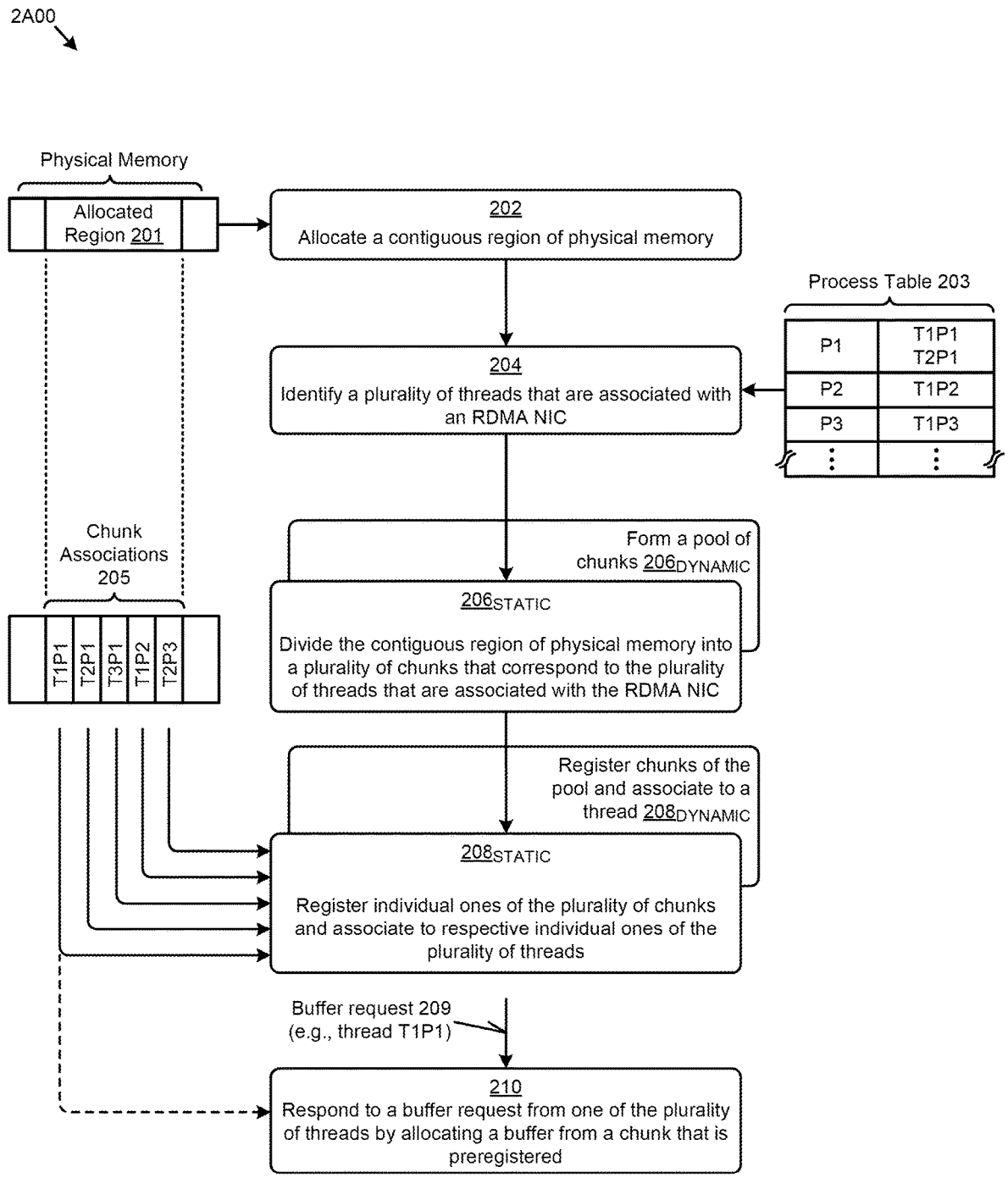
FIG. 2A illustrates a lockless buffer allocation technique that pre-assigns preregistered memory chunks to respective worker threads prior to their invocation of RDMA I/O operations, according to an embodiment.

FIG. 2A illustrates a lockless buffer allocation technique 2A00 that pre-assigns preregistered memory chunks to respective worker threads prior to their invocation of RDMA I/O operations. As an option, one or more variations of lockless buffer allocation technique 2A00 or any aspect thereof may be implemented in the context of the architecture and functionality of the embodiments described herein and/or in any environment.

The shown flow begins upon allocation of a contiguous region 201 of physical memory (step 202). Next, step 204 serves to identify a plurality of threads that are associated with a particular RDMA NIC. Step 202 and step 204 might be commenced after some system initialization period such as after processes that are associated with a particular application or workload have completed their respective initialization routines. More specifically, step 202 and step 204 might be commenced after some system initialization period such as after processes that are associated with a particular RDMA NIC have completed their respective initialization routines. In some situations, such as when a particular computing system is dedicated to a particular task, the number and configuration of the processes of the application can be known a priori.

Further in some situations the temporal profile of RDMA I/O operations as well as the size and mix of RDMA I/O operations can be known a priori. In these situations, a static chunk-to-thread mapping technique (step $206_{STATIC}$) can be executed to form chunk associations 205. More specifically, step $206_{STATIC}$ divides the region of physical memory into a set of statically-assigned chunks that are assigned in a 1-to-1 correspondence to a set of process threads. For example, a process table 203 can be accessed to identify running processes (e.g., process P1, process P2, Process P3, etc.), which running processes in turn have corresponding one or more threads (e.g., thread T1P1, thread T2P1, thread T1P2, thread T1P3, etc.). Further, in some embodiments, step 208STATIC serves to register individual ones of the chunks to respective individual ones of the plurality of threads.

In other situations, such as when a particular computing system is dedicated to a particular task, it often happens that the number and configuration of the processes of the application can be known a priori. However, if neither the temporal profile of RDMA I/O operations nor the size and mix of RDMA I/O operations can be known a priori, a dynamic chunk-to-thread mapping technique (e.g., step $206_{DYNAMIC}$) can be executed to divide the physical memory into chunks that form a pool. For example, and as shown by step $208_{DYNAMIC}$, individual ones of the chunks of the pool can be registered to respective individual ones of the plurality of threads.

At some moment in time, a worker thread may raise a buffer request (e.g., buffer request 209). In this flow of FIG. 2A, step 210 processes the buffer request by allocating a buffer from a chunk that had been preregistered with the RDMA NIC. In this example, thread T1P1 requests a buffer which is then carved from a preregistered chunk.

The foregoing implementations of chunk-to-thread mapping techniques (e.g., step $206_{STATIC}$ and step $206_{DYNAMIC}$) can be carried out singly or in combination. Moreover the foregoing implementations of step $206_{STATIC}$ and step $206_{DYNAMIC}$ can be carried out singly or in combination over multiple time epochs. This is shown and described as pertains to FIG. 2B.

Figure 2B:
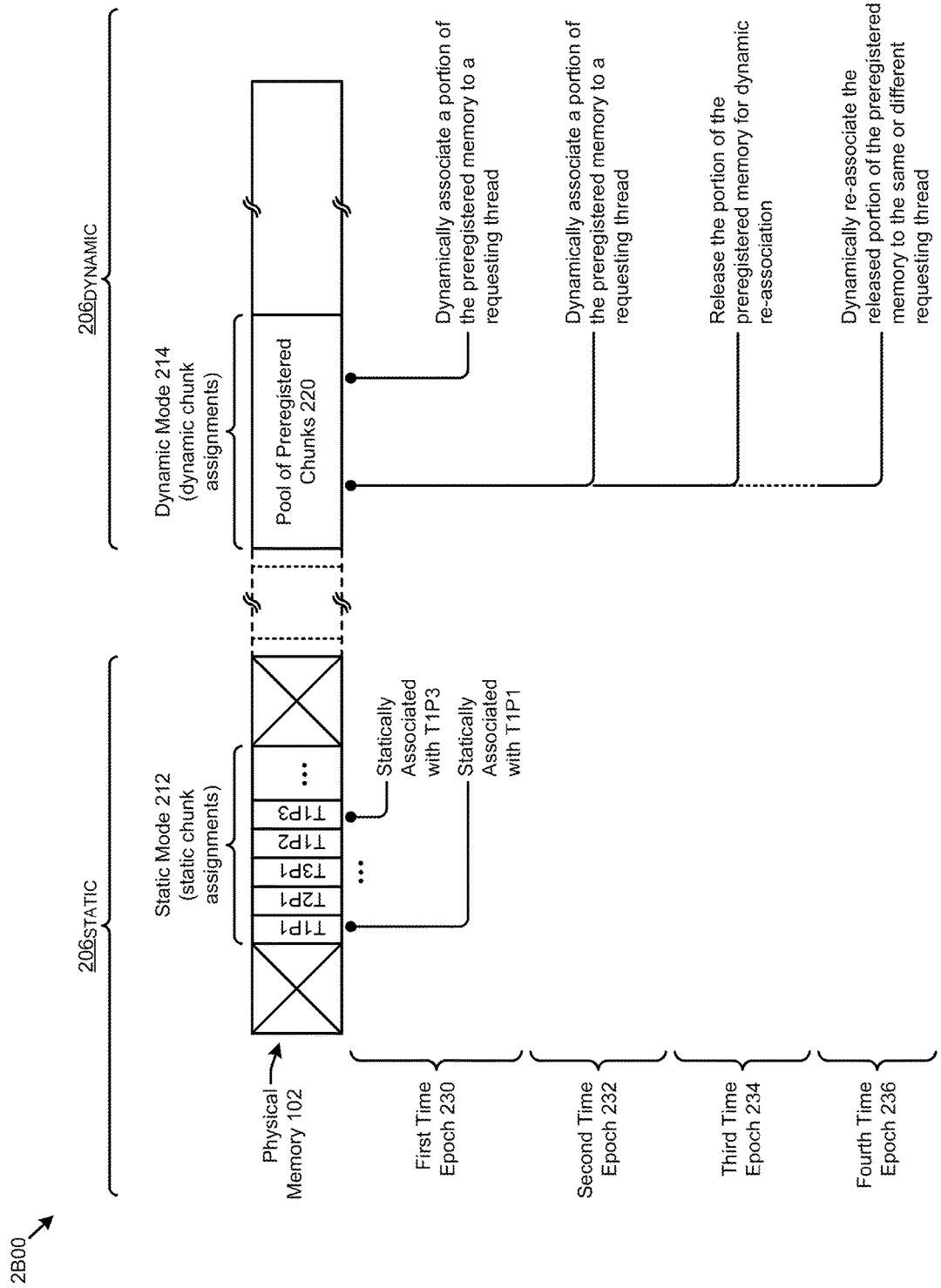
FIG. 2B illustrates several alternative chunk-to-thread mapping techniques that facilitate lockless allocation of buffers to worker threads, according to an embodiment.

FIG. 2B illustrates several alternative chunk-to-thread mapping techniques 2B00 that facilitate lockless allocation of buffers to worker threads. As an option, one or more variations of alternative chunk-to-thread mapping techniques 2B00 or any aspect thereof may be implemented in the context of the architecture and functionality of the embodiments described herein and/or in any environment.

Specifically, both the static chunk-to-thread mapping technique $206_{STATIC}$ and the dynamic chunk-to-thread mapping technique $206_{DYNAMIC}$ can operate concurrently over the same physical memory 102. As shown, operations of a static mode 212 are carried out over a first portion of the physical memory 102, whereas operations of a dynamic mode 214 are carried out over a second portion of the physical memory 102. In a first time epoch 230, a first selected chunk from a first region of physical memory is statically associated with thread T1P1 and a second selected chunk from the first region of the physical memory is statically associated with thread T1P3. In this particular example of static mode 212, those associations remain unchanged in future time epochs.

Additionally or alternatively, operations of a dynamic mode 214 are carried out over a second portion of the physical memory 102 such that in the first time epoch a buffer carved from a dynamically-selected chunk from a pool of preregistered chunks 220 is dynamically associated with a first requesting thread. In this particular example, dynamic mode 214 applies to several time epochs. As shown, in a second time epoch 232, all or a portion of a chunk from the pool is associated with a buffer request of a second requesting thread. Then, in a third time epoch 234, the first requesting thread releases it associated buffer. In a fourth time epoch 236, the first requesting thread dynamically re-acquires a dynamic re-association.

The foregoing associations, whether caused by operation of static mode 212 or by operation of dynamic mode 214 can record associations in a data structure. Such a data structure as well as mechanisms for maintaining the data structure are shown and described as pertains to the chunk-to-thread mapping data of FIG. 2C.

Figure 2C:
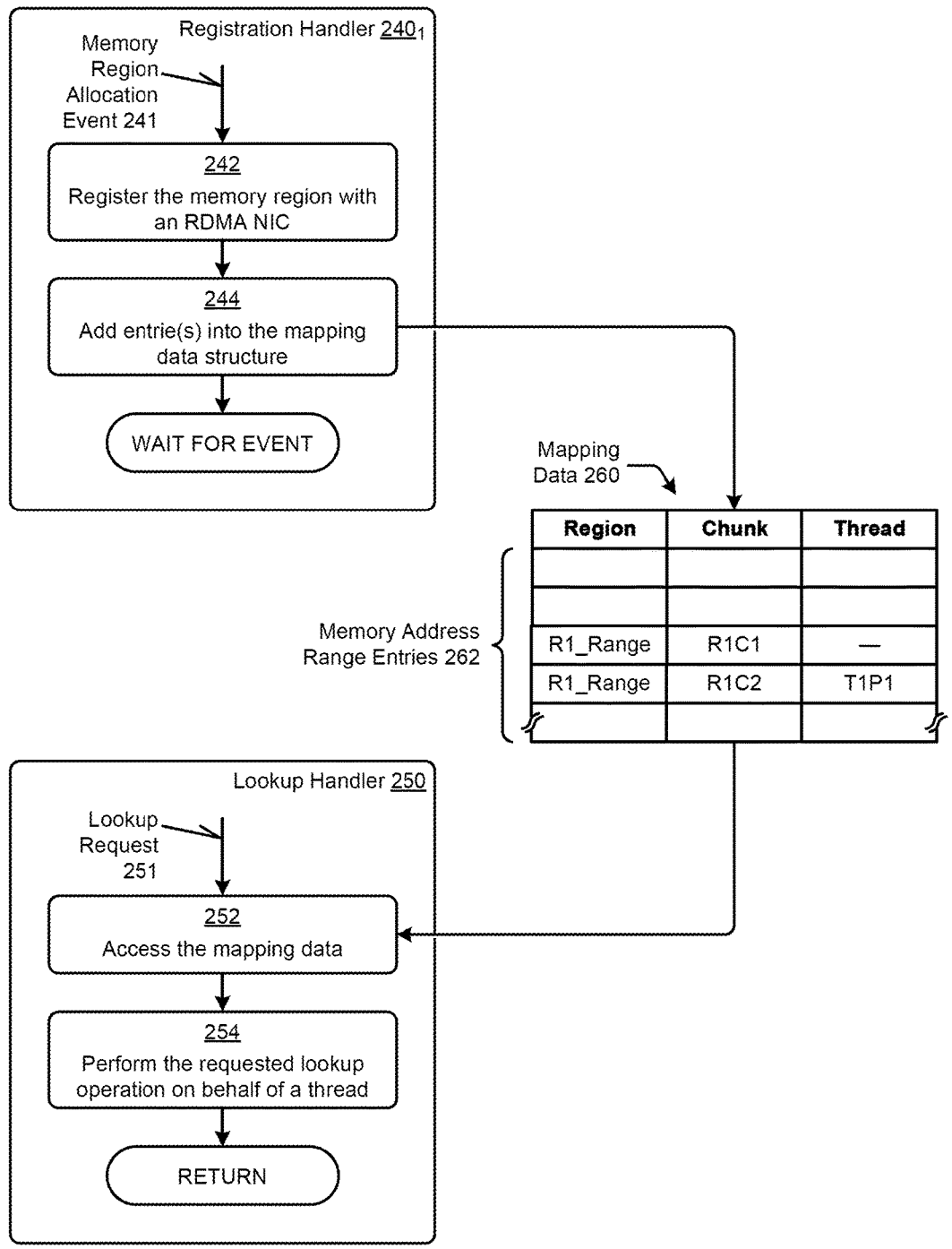
FIG. 2C illustrates a data structure and example mechanisms for updating and accessing chunk-to-thread mapping data, according to an embodiment.

FIG. 2C illustrates a data structure and example mechanisms 2C00 for updating and accessing chunk-to-thread mapping data. As shown, a registration handler $240_1$ serves to register a particular region of memory with an RDMA NIC (step 242). This happens in response to detection of a memory region allocation event 241. More specifically, upon a memory region allocation event 241, the region or chunks therefrom are registered with an RDMA NIC. The memory address range entries 262 of a particular region (e.g., R1_Range) is entered into a data structure (e.g., mapping data 260). Further, an entry is made for each chunk that is carved from the region (e.g., R1C1, R1C2). In the event that the operations of the registration handler are performed on behalf of a particular thread, a process/thread ID (e.g., T1P1) is also entered into the data structure.

This data structure is continuously maintained (e.g., in a safe location) and continuously updated (step 244) to reflect occurrence of each incoming memory region allocation event 241. More specifically, this data structure is continuously maintained to facilitate lookup operations that facilitate mapping and/or caching operations.

As shown, lookup handler 250 responds to a lookup request 251 by accessing the mapping data (at step 252) to perform the requested lookup operation or operations. The lookup handler 250 is able to perform many different types of lookup operations based on the contents of the mapping data and based on address and/or metadata values included in the lookup request. Strictly as one example step 254 of lookup handler 250 is able to determine which thread corresponds to a given address of a memory region (MR). As another example, step 254 of lookup handler 250 is able to determine whether a given address is even within any of the memory regions in any of the MR entries of the mapping data structure.

FIG. 3 illustrates several alternative memory preregistration techniques 300 that facilitate lockless allocation of buffers to worker threads. The figure is being presented to illustrate how multiple different methods can be used, singly or in combination, to accomplish lockless allocation of buffers to worker threads. More specifically, the chart of FIG. 3 presents three different methods, each having different operational characteristics which each have corresponding tradeoff and optimization considerations.

As shown, in correspondence with a first approach, the entire memory space of a process can be pinned and then preregistered with an RDMA NIC. While this approach incurs only one preregistration event, this approach often leads to massive over-provisioning or under-provisioning. An alternative approach might be to preregister chunks of memory, and then to statically associate the preregistered chunks of memory to threads. Ongoing performance of a system that implements in accordance with this approach may be non-optimal, especially if/when the static associations of the preregistered chunks of memory to threads is mismatched with respect to changing temporal I/O patterns and/or changing RDMA I/O size characteristics.

Yet another alternative approach might be to enter preregistered chunks of memory into a pool, and then to dynamically associate all or portions of the preregistered chunks from the pool based on demands expressed by requesting threads.

The latter approach supports multiple buffer management modes, i.e., (1) contiguous address range region growth, and (2) random address range growth. This latter mode permits regions to be extended with "holes". While management/reuse of chunks across threads becomes more complicated when there is nonuniform IO distribution across the threads (e.g., nonuniform in terms of payload size and number of I/Os outstanding), this model works in environments where system memory allocations may return allocated system physical memory regions in non-overlapping, but not necessarily contiguous, address spaces.

Figure 4:
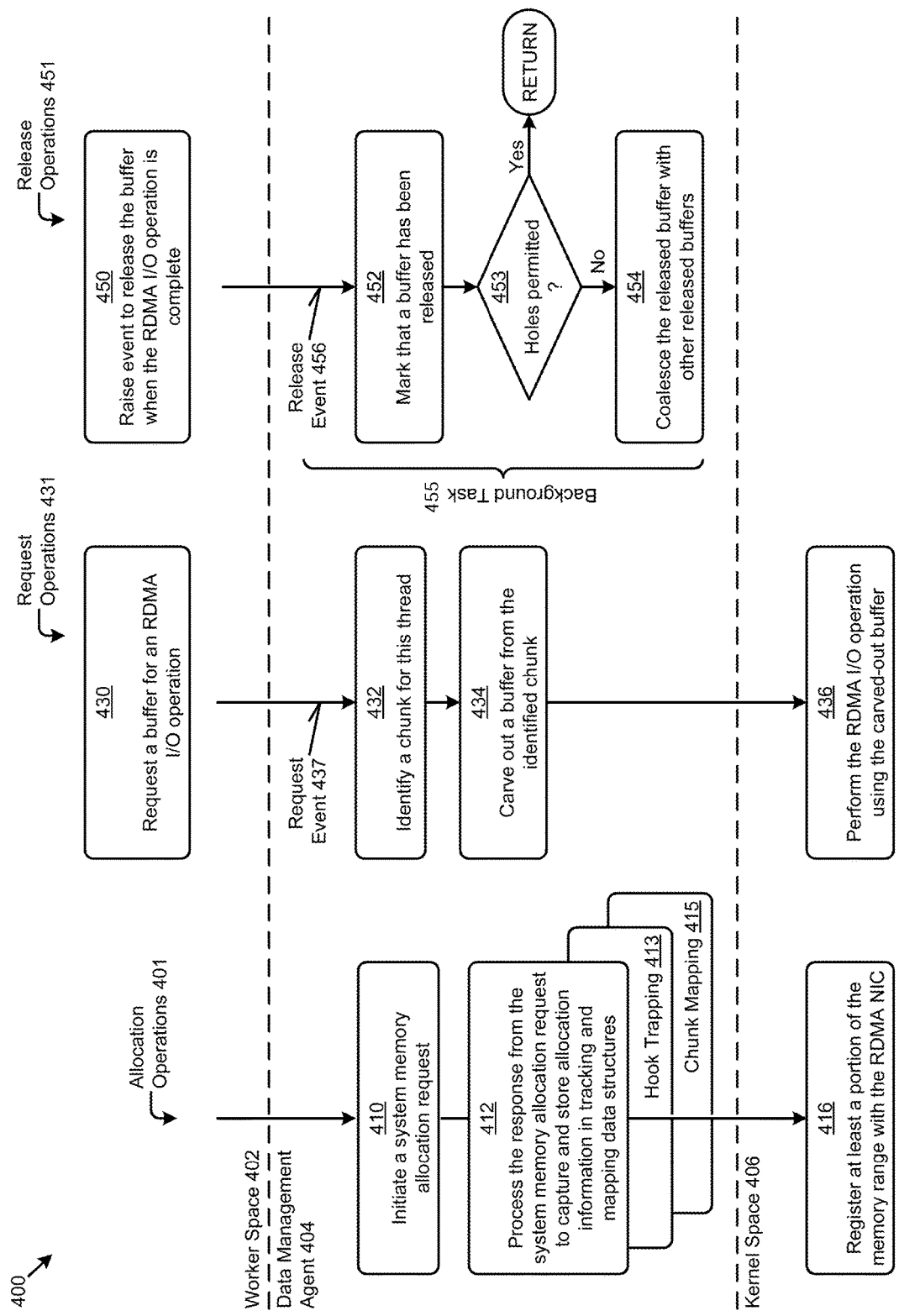
FIG. 4 illustrates example buffer memory allocation, request and release operations that facilitate lockless allocation of buffers to worker threads, according to an embodiment.

FIG. 4 illustrates example buffer memory allocation, request and release operations 400 that facilitate lockless allocation of buffers to worker threads. As an option, one or more variations of preregistration, request and release operations 400 or any aspect thereof may be implemented in the context of the architecture and functionality of the embodiments described herein and/or in any environment.

The figure is being presented to illustrate one possible partitioning of operations that are carried out by multiple actors. The shown embodiment includes some operations that are carried out by a worker thread in worker space 402 (e.g., in user space of an operating system, in a virtual machine of a virtualization system, etc.), some operations that are carried out by a data management agent 404, and some operations that are carried out by an RDMA NIC driver in kernel space 406.

The shown example operations include allocation operations 401, request operations 431, and release operations 451. Certain portions of the operations can be carried out by the data management agent, and such portions can be executed synchronously or asynchronously with operations of the worker processes. For example, in some cases, a worker process makes a synchronous call to a routine that executes in the context of the thread. However, in other cases, a worker process signals the data management agent (e.g., the worker process raises an event), and the data management agent in turn executes one or more background tasks in its own context, thus carrying out data management agent operations asynchronously with respect to any worker thread.

One specific example where the data management agent operations are carried out asynchronously with respect to any worker thread is when the data management agent initializes data structures and interfacing, possibly prior to a time when there is any worker thread in existence on the system. This specific example is shown under allocation operations 401. Specifically, at any point in time, the data management agent can pursue initialization and initial population of mapping and tracking data structures. Such initialization and initial population of mapping and tracking data structures is initiated in step 410, where a call to a system memory allocator is made, after which, at step 412, the response from the system memory allocator is processed.

The processing of step 412 might include initialization of tracking data structures (e.g., data structures to maintain whether or not a particular memory address range is in use or not) as well as initialization of mapping data structures (e.g., data structures to maintain a record of how memory address ranges are associated to threads). The processing of step 412 might include hook trapping (step 413) and/or chunk mapping (step 415). Certain system memory allocators expose hooks that can be trapped so as to stay aware of virtual addresses that are being memory mapped. Further, these virtual addresses that are being memory mapped can be used when registering the memory mapped region with an RDMA NIC (or other DMA-capable devices). More specifically, by trapping via the memory mapping hooks, and by maintaining mapping data structures, the data management agent can always be aware of which memory regions have already been registered with an underlying RDMA NIC. Once at least some of the processing of the response from the system memory allocator has completed (e.g., the memory address range of the allocated memory region is known) then, at step 416, at least a portion of the memory range is registered with the RDMA NIC. The RDMA NIC is now configured to be able to DMA into or out of the registered memory range.

At some moment in time, a worker thread in worker space will want to cause an RDMA operation over the RDMA NIC. Considering an example where the aforementioned worker thread is initiating an RDMA operation (e.g., the worker thread wants to send data to a target location), the worker thread will commence request operations 431. Specifically, and as shown, the worker thread will request (step 430) a buffer to be used as a source for an RDMA operation. The request is received, either synchronously (e.g., via a subroutine call) or asynchronously (e.g., via request event 437), by the data management agent, whereupon the data management agent will (1) identify a chunk that is associated with the requesting thread (operation 432), and (2) carve out a buffer from the identified chunk (operation 434). The chunk can be identified based on then-current values in the mapping data structures, and the specific range of the carved-out buffer can be based on then-current values in the tracking data structures.

In some cases, the request (step 430) refers to a user buffer that contains data to be copied into the carved-out buffer, in which case the data is copied from the user buffer into the carved-out buffer prior to performing the RDMA I/O operation (step 436). In other cases, the request (step 430) seeks to obtain exclusive access to a carved-out buffer, after which, once exclusive access to a carved-out buffer is acquired, then the worker thread can populate data directly into the carved-out buffer (e.g., with data to be RDMA'd), in which case, there is no need for data to be copied from a user buffer into the carved-out buffer prior to performing the RDMA I/O operation (step 436).

FIG. 4 also depicts release operations 451. The release operations can be carried out synchronously or asynchronously with respect to execution of the data management agent. The particular flow depicted under release operation 451 exemplifies how a data management agent can execute a background task 455 to perform certain operations asynchronously with respect to execution of any particular worker thread. In this example, a worker thread raises an event (step 450) to release a buffer after a corresponding RDMA I/O operation that uses the buffer has completed. Background task 455 listens for such events, and responds to an event raised by a worker thread (e.g., release event 456) by marking that the buffer is now released (step 452). In some cases the background task merely indicates that the buffer is now released (e.g., by updating tracking data structures), whereas in other cases, the background task carries out data structure management functions such as garbage collection. In this example, background task 455 determines (decision 453) if the garbage collection regime permits "holes" (i.e., non-contiguous distribution of available buffers) and, if so, the "Yes" branch of decision 453 is taken. If the garbage collection regime does not permit "holes" then the "No" branch of decision 453 is taken and, at step 454, the released buffer is coalesced with adjacent buffers.

The foregoing operations can be partitioned in any manner. An example dynamic memory management partitioning is shown and described as pertains to FIG. 5A.

Figure 5A:
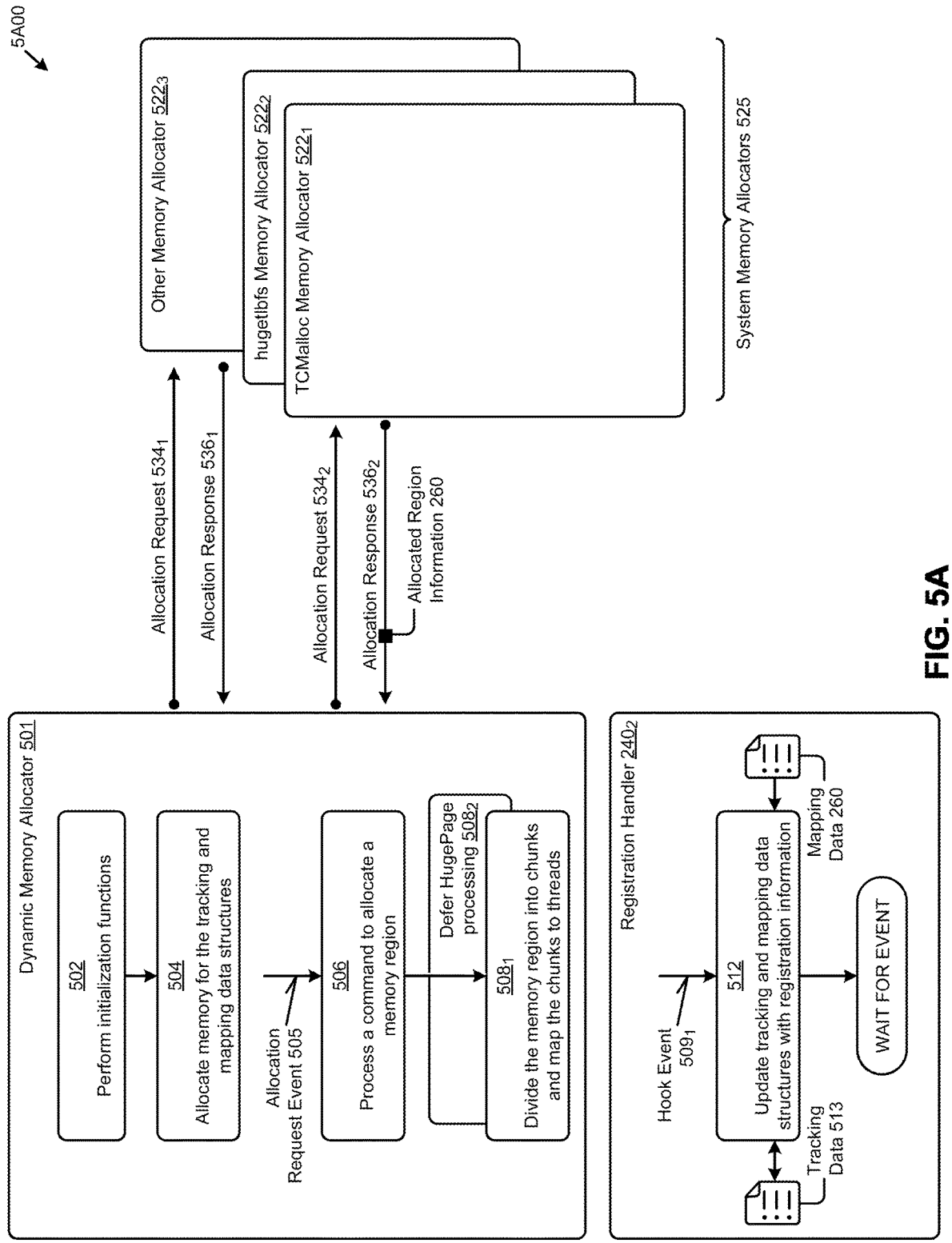
FIG. 5A illustrates an example dynamic memory management partitioning as used during allocation and caching of preregistered memory regions for RDMA I/O operations, according to an embodiment.

FIG. 5A illustrates an example dynamic memory management partitioning 5A00 as used during allocation and caching of preregistered memory regions for RDMA I/O operations.

The figure is being presented to illustrate that many different types of system memory allocators that can be used by a dynamic memory allocator. As shown, there are three system memory allocators. A first system memory allocator might correspond to "TCMalloc" memory allocator 5221, a second system memory allocator might correspond to a Linux "hugetlbfs" memory allocator 5222, and a third system memory allocator might correspond to yet another system memory allocator (e.g., other memory allocator 5223). The different system memory allocators can be used singly or in combination.

In exemplary circumstances, the dynamic memory allocator 501 performs some self-initialization functions (step 502), after which the dynamic memory allocator can allocate memory (step 504) for the aforementioned tracking and mapping data structures. As shown, the dynamic memory allocator may request memory for the aforementioned tracking and mapping data structures by issuing a request (e.g., allocation request $534_1$), and processing a response (e.g., allocation response $536_1$) to/from any of the system memory allocators 525. The system memory allocator that is used for allocating memory for tracking and mapping data structures might be the same or might be a different memory allocator as used for allocation of memory to be registered for RDMA I/O. Moreover, a particular system memory allocator might support hooks such that calling processes can be notified when the particular system memory allocator performs any particular operations.

The shown dynamic memory allocator 501 includes a mechanism for responding to an allocation request event 505, which allocation request event might be self-raised by the dynamic memory allocator (e.g., during initialization), or might be raised due to a later-raised allocation request event. Upon occurrence of allocation request event 505, the dynamic memory allocator interacts (step 506) with a system memory allocator (e.g., via allocation request $534_2$ and allocation response $536_2$). The allocation response may include allocated region information 260. Based on the allocated region information 260, the allocated region is then divided into chunks (step $508_1$) that are in turn mapped to threads. Alternatively, division of the allocated region into chunks and/or assignment of the chunks to threads may be deferred (step $508_2$). In some cases, division of the allocated region into chunks and/or assignment of the chunks to threads may be deferred until the system memory allocator raises a hook event $509_1$. Such a hook event can cause processing within a registration handler $240_2$ to be invoked. In the particular implementation of registration handler $240_2$, the hook event $509_1$ causes invocation of step 512, which serves to update tracking data 513 as well as mapping data 260. All or portions of the processing of step 512 can be carried out asynchronously with respect to any thread. Moreover, all or portions of processing of step 512 can be carried out asynchronously with respect to any system memory allocator.

Some embodiments leverage the fact that TCMalloc is (1) HugePage aware, and (2) the fact that TCMalloc provides hooks that are integrated with its "hugetlbfs" allocator. As such, whenever TCmalloc is called to map HugePage memory into process address space, the information available in the hook can be used to register these HugePage regions. More specifically, the hook event and information available in the hook itself can be used to initiate background processing of a large region of memory into individually registered memory units for RDMA I/O operations. Such background processing is particularly important when very large regions of memory are allocated. More specifically, it can happen that a very large region of memory would need to be divided into many chunks, and such division should be carried out as a background task rather than in the context of any worker thread. To emphasize the importance of carrying out division of a large region of memory into many chunks in a background task rather than in the context of any worker thread, consider an example where a 50 GB memory region might need to be divided into constituent 2M chunks. This would mean that over 25K chunks might need to be marked, possibly added to a pool, and possibly registered. An example background registration technique is shown and described as pertains to FIG. 5B.

As used herein, the term "HugePage" refers to large contiguous portions of physical memory as allocated by a memory allocator of a Linux, or Linux variant operating system. Use of HugePages allows the operating system to support memory pages greater than 4 KB. HugePage sizes can vary from 2 MB to 256 MB or larger.

Figure 5B:
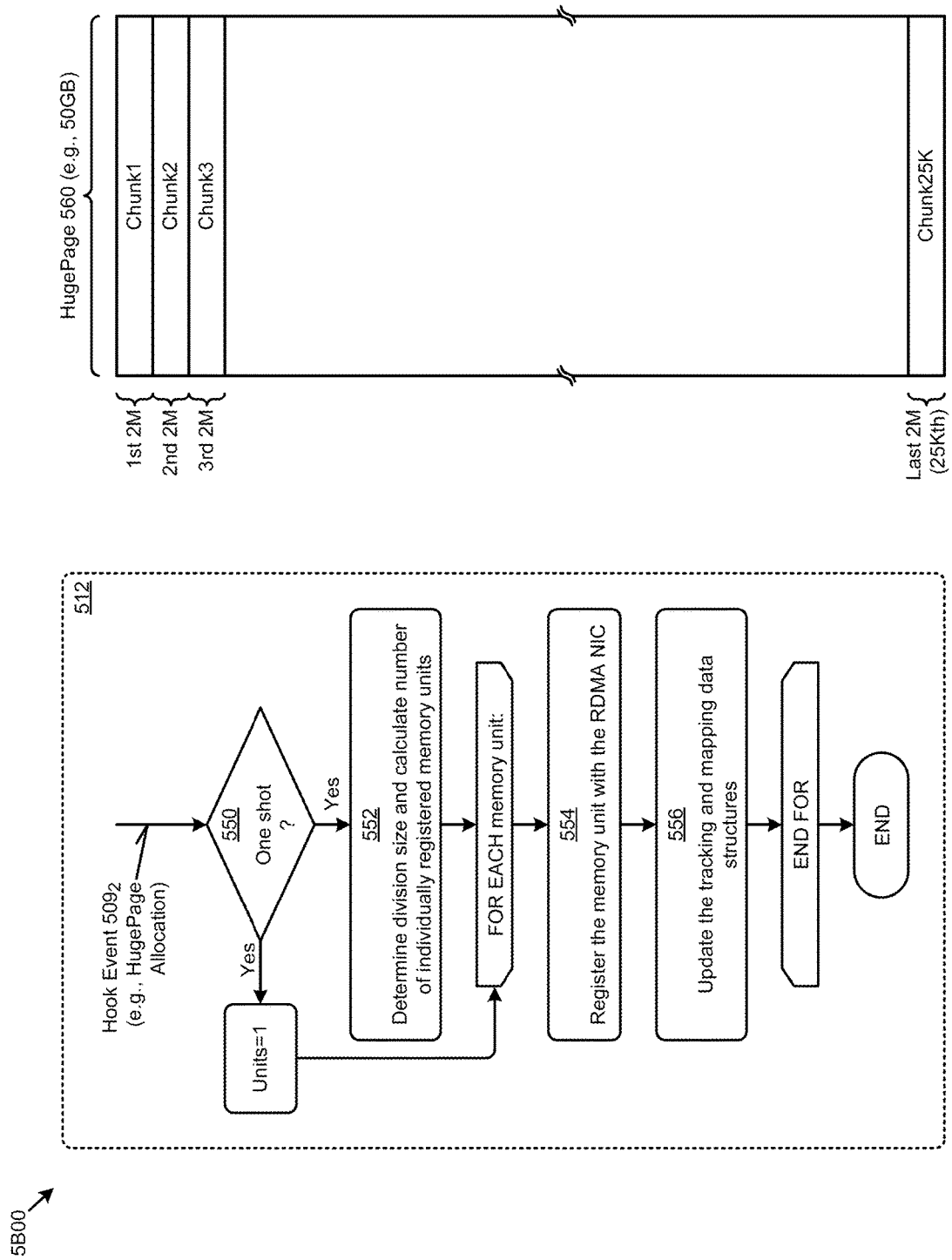
FIG. 5B illustrates an example background registration technique for dividing a large memory region into individually registered memory units for RDMA I/O operations, according to an embodiment.

FIG. 5B illustrates an example background registration technique 5B00 for dividing a large memory region into individually registered memory units for RDMA I/O operations. The figure is being presented to exemplify how even a very large memory region can be preprocessed so as to facilitate lockless allocation of RDMA buffers to requesting threads.

The background registration technique 5B00 is merely one implementation of the foregoing step 512. As shown, large memory region preprocessing commences upon occurrence of a hook event 5092, whereupon a determination is made (decision 550) as to whether the entire memory region (e.g., the shown HugePage 560) corresponding to the hook event 5092 is to be registered in one shot (the "Yes" branch of decision 550) or if the memory region corresponding to the hook event 5092 is to be first divided into constituent chunks (the "No" branch of decision 550) prior to registration. In the latter case, step 552 is entered to calculate the size(s) and number(s) of constituent chunks. The calculation of the size and number of constituent memory units (e.g., chunks) might be determined merely by an arithmetic calculation (e.g., 50 GB divided by 2M=25K) or, the size and number of constituent memory units might be determined based on a non-uniform distribution of RDMA memory usage, which non-uniform distribution may in turn depend on the workloads being performed by the worker threads.

After such a calculation or other determination of the size(s) and number(s) of constituent memory unit (e.g., chunks), a FOR EACH loop is entered within which, for each memory unit, step 554 registers the memory unit with an RDMA NIC, and step 556 updates the tracking and mapping data structures.

Figure 6:
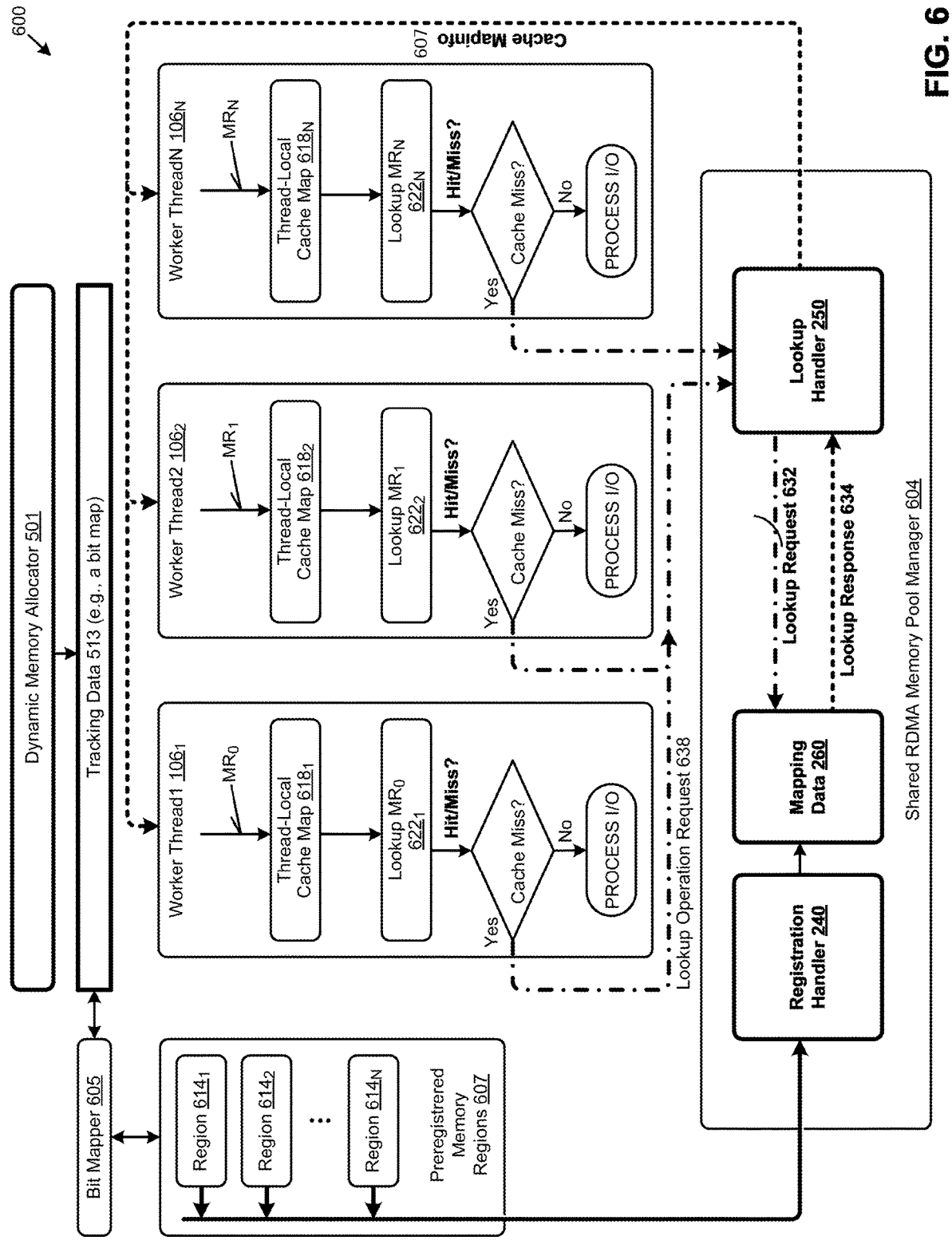
FIG. 6 illustrates an example high-performance computing system that implements allocation and caching of preregistered memory regions for use in RDMA I/O operations, according to an embodiment.

Instances of the foregoing tracking and mapping data structures, plus instances of the heretofore-discussed dynamic memory allocator, registration handler, and lookup handler can be configured to interoperate in a high-performance computing system, one example of which is shown and described as pertains to FIG. 6.

FIG. 6 illustrates an example high-performance computing system 600 that implements allocation and caching of preregistered memory regions for use in RDMA I/O operations. As an option, one or more variations of high-performance computing system 600 or any aspect thereof may be implemented in the context of the architecture and functionality of the embodiments described herein and/or in any environment.

The figure is being presented to show how computing threads (e.g., worker thread1 $106_1$, worker thread2 $106_2$, and worker threadN $106_N$) interact with a shared RDMA memory pool manager 604. As shown, dynamic memory allocator 501 interacts with tracking data 513 to (a) allocate memory regions (e.g., region $614_1$, region $614_2$, . . . , region $614_N$) that are to be managed as constituents in the shared RDMA pool, and to (b) keep track of which memory regions have been allocated to any particular worker thread.

In a bring-up phase of the system, a set of preregistered memory regions 607 are made accessible to a registration handler 240 that serves to satisfy requests from worker threads for association and release of a preregistered, memory mapped address range (e.g., chunk) of memory. As shown, there is no lock manager. Since the preregistered memory regions are pre-allocated, preregistered, and then associated and released on a per thread basis, there is no possibility for a critical region of code where multiple threads could possibly (i.e., without locks or semaphores) doubly allocate a region.

The shared RDMA memory pool manager 604 includes a lookup handler 250 that receives a request or requests from a particular thread or threads. Based on information in lookup operation request 638, the lookup handler 250 identifies a preregistered region that had been pre-associated to the particular thread, and then satisfies the worker thread's request by giving the requestor the memory mapping information needed for the requestor thread to use the allocated memory as a buffer for an RDMA I/O operation. More particularly, the lookup handler can access mapping data 260 to lookup the address range of a preregistered memory region that had been pre-associated to the particular requesting thread. In this lockless manner, the RDMA memory pool manager implements access of registration information from multiple threads. Furthermore, in this lockless manner, the RDMA memory pool manager implements dynamic buffer-to-thread associations without requiring a lock when accessing constituents of the RDMA memory pool.

Managing Remote Keys for RDMA Transfers

When registering memory, the registration information contains information pertaining to keys (e.g., local keys, remote keys), which keys are used when carrying-out an RDMA transfer. Key information can be stored in any location that is accessible, directly or indirectly, by any RDMA worker thread. As one example, specifically pertaining to HugePage mapping, key information is distributed (e.g., replicated as needed) in memory such that every chunk (e.g., 2M chunk) has an associated key. In some embodiments, the keys can be stored in a key data structure than has an association between the start address of a chunk, the memory registration information of that chunk, and the key information. This key data structure can be cached by each thread. As such, regardless of where buffer allocations are performed (e.g., regardless of whether buffer allocations are performed by a background processing entity or not), any RDMA worker thread can access keys from its cache.

In accordance with the foregoing, once a preregistered chunk of memory that had been preregistered in correspondence with the requesting worker thread has been identified, the worker thread can use the preregistered RDMA memory and keys for I/O operations through an RDMA NIC. The preregistered RDMA memory can be released back to the shared RDMA pool immediately at the completion of the I/O operation, or the preregistered chunk of memory can be released based on expiration of a timeout period. Tracking data 513 serves to keep track of which portions of any memory ranges of any constituent in the shared RDMA pool are in use (or free). In some implementations, such as that shown in FIG. 6, a bit mapper 605 serves to correspond whether or not a particular portion of any memory range of any constituent in the shared RDMA pool is either in use or is free. Such a bit mapper serves the foregoing function (1) in cases where holes in the registered memory are permitted, and (2) in cases where holes in the registered memory are not permitted. In some implementations, data structures other that a bit map are used to determine whether or not a particular memory range of any constituent in the shared RDMA pool is either in use or is free.

As shown, each worker thread is associated with a thread-local cache (TLC) in which buffer data (and/or buffer address data) is stored. It should be noted that although buffers may have start addresses that are other than the start address of a chunk from which the buffers are carved, the needed registration details pertaining to the chunk from which the buffers are carved, can be retrieved from the foregoing chunk-oriented key data structure. In one specific implementation, the address of a given buffer is down aligned or otherwise manipulated to associate the given buffer start address to a 2M boundary of a chunk address, and then, using that down aligned address, the keys for that chunk can be accessed.

Handling Cache Misses

The thread-local cache is configured to identify whether or not particular buffer data (and/or buffer address data) is in the TLC and, if not, to access lookup handler 250, which in turn identifies the memory-mapped location of the particular buffer data. A lookup handler can execute in the context of a calling thread to issue a lookup request 632, and process a corresponding lookup response 634. Alternatively, a lookup handler can execute in a context other than the thread to issue a lookup request 632, and process a corresponding lookup response 634 (e.g., on behalf of a thread). As mentioned above, each worker thread is associated with a thread-local cache in which either (i) buffer data, or (ii) buffer addresses (or both) are stored. In the former approach, where the buffer data itself is stored in the TLC, there is a copy from the memory of the cache to the preregistered RDMA memory, whereas in the latter approach, where the cached item is a memory reference to preregistered RDMA memory rather than data itself, it is possible to avoid the aforementioned copy since the data is already in preregistered RDMA memory.

In the latter approach, instead of caching data, the TLC caches the memory registration information, which is small (e.g., typically only 48 bytes for every memory region registered). As such, there is no need to move data from the TLC into preregistered RDMA memory. Rather, the thread can store and/or retrieve data directly to/from the preregistered RDMA memory. Memory registrations can be shared across threads since these particular types of registrations are global and do not mutate.

Each thread can access its buffer data (i) immediately upon a cache hit (i.e., from a location in its thread-local cache) or, (ii) subsequent to a cache miss, and after a lookup, the thread can access its buffer data from its thread-local cache once the buffer data as copied from the shared RDMA pool has been brought into the thread-local cache.

To illustrate, a worker thread (e.g., worker thread $106_1$, worker thread2 $106_2$, . . . , worker threadN $106_N$) can access its respective thread-local cache map (e.g., thread local cache map $618_1$, thread local cache map $618_2$, . . . , thread local cache map $618_N$) and perform a local lookup of a memory region (e.g., via lookup MR0 $622_1$, lookup MR2 $622_2$, . . . , lookup MRN $622_N$). In the event of a hit, the worker thread can directly access the data that is stored in the TLC, or indirectly via the reference to preregistered RDMA memory that is stored in the TLC. Otherwise, in the event of a cache miss, the thread can initiate a lookup operation request 638, which, by operation of the lookup handler, causes either (1) contents of preregistered RDMA memory to be loaded into the TLC, or (2) a reference to preregistered RDMA memory to be loaded into the TLC. Thread processing is entered again. This time through, however, the needed data or reference to preregistered RDMA memory is in the TLC.

Additional Embodiments of the Disclosure

HugePage Implementation Examples Using TCMalloc and RDMA

TCMallocExtension( ) class (i.e., from the tcmalloc library) exposes memory mapping MMAP hooks which can be tapped for registering with any DMA-able devices. By trapping the MMAP hooks, operational elements maintain awareness of the virtual addresses being memory mapped into the process address space, thus allowing any eventual I/Os referencing this memory mapped space to be used in RDMA I/O operations.

SPDK Implementation Examples

In the specific case of using the storage performance development kit (SPDK), hooking into the memory allocator is done by invoking the 'spdk_mem_register' application programming interface (API) in the hook function's context on the address being memory mapped. This API has been configured to not perform any allocations internally, and thus avoids the well-known malloc reentrancy problem. A similar model can be adopted for alternative system memory implementations, specifically by invoking an appropriate API from the context of the hook.

As discussed above, and as discussed in further detail hereunder, there are mechanisms that allow user space applications to dynamically grow its process address space using any allocation library (e.g., tcmalloc) that provides MMAP hooks. Ongoing thread-safe maintenance of registration information (e.g., memory mapped regions) means that any thread can retrieve the memory region information (e.g., to be used in an RDMA transfer), and can do so without acquiring locks.

One approach is as follows:
i) The MMAP hook will "mark" the memory mapped addresses.
ii) A background thread will register the memory mapped addresses (i.e., out-of-context of the MMAP hook).

Alternatively, it is possible to MMAP the entire HugePage region (e.g., to reserve it for a data management agent) so that all the registrations can be done outside of the fast path of an RDMA I/O. The above techniques can be used in many variations, two of which are discussed hereunder: Variation 1—Contiguous MMAPed memory (i.e. no holes) and Variation 2—Non-contiguous memory mapped memory (i.e., holes may be present).

Contiguous MMAPed Memory (i.e., No Holes)

Marking during MMAP hook:
a. In this variation, mark the start and end index of the regions in the hook, which are the newly mapped regions yet to be registered. Each time the hook is triggered, the end region is expanded.
b. When a background thread registers, it will clear these indices so that the next schedule only has the delta mappings since the last registration.

Contiguous MMAPed Memory Background Registration

The registration for this background registration variation can be performed as follows: (1) register in units of 2M chunks or in multiples of 2M chunks, or (2) register the entire HugePage region. The background thread can then proceed to register iteratively such that every registration starts from the very first memory mapped HugePage region up to the very last, thereby extending the registered memory by one unit with each registration. The advantage in this contiguous MMAPed memory model is that the latest registered memory region always points to the entire HugePage region until the last MMAP; hence this memory region can be cached with minimal overhead and therefore, a thread will not have to encounter a lock acquisition for retrieving the memory registration info. Any data transfer that is in progress on a prior memory region would still continue to be performed.

Non-Contiguous Memory Mapped Memory (i.e., Holes)
  Marking during MMAP hook:
    In this variation, holes are permissible in the memory mapped regions. Hence the marker can 'set' the memory mapped indices in a pre-allocated bit array. The bit array must be allocated before the TCMalloc hooks are initialized/registered and sized based on the number of 2 MB chunks that will form the expected HugePage size to be memory mapped. The start index and end index denote the first region and the last region that are yet to be registered, respectively.

Non-Contiguous Memory Mapped Memory Background Registration

In this variation, registration can be done in one of the two ways: (1) register in 2 MB chunks or (2) register contiguous regions. As an example, when the background thread kick-starts the registration schedule, indices starting from the start index are traversed in the bit array and registration is performed for those indices that have been 'set' (i.e. value '1'), until the end index is reached. Note that it is possible to either register these regions as individual 2M chunks or to cluster the contiguous chunks together (until a hole or a 'zero' index is reached in the bit array) and thereby register a larger multiple of 2M chunk. To preserve memory information, various implementation are possible: (1) maintain a map associating a 2M-aligned address to its memory registration, or (2) maintain a range collection where ranges of addresses point to their respective registered memory ranges.

One advantage in this model is that every registration is only for newly memory mapped addresses that have occurred since the last registration schedule, and is therefore more efficient than registering the entire HugePage region. However, the size of the caching map for each thread would increase since there will be numerous memory region entries to me maintained.

Handling Outgoing Transfers

Outgoing data transfers over an RDMA channel will look up its memory registration info. If the background thread has not already registered the memory being looked up, then the lookup path will result in the registration of the underlying HugePage regions encompassing the buffer's memory. Alternatively, contents of a buffer memory can be copied to a preregistered HugePage portion. The contiguous memory mapped memory (no hole) model for HugePage support with RDMA also includes the ability to do thread local caching. This eliminates lock acquisition overhead that would otherwise be incurred for the lookup of the memory registration info.

Handling Historical Buffer Payload Size Demand

In some embodiments, the sizes of preregistered chunks in the RDMA buffer pool are apportioned into multiple sizes based on a historical buffer payload size demand profile.

Further details regarding general approaches to apportioning into multiple sizes based on a historical buffer payload size demand are described in U.S. Pat. No. 10,824,369, issued on Nov. 3, 2020, which is hereby incorporated by reference in its entirety.

Instruction Code Examples

Figure 7:
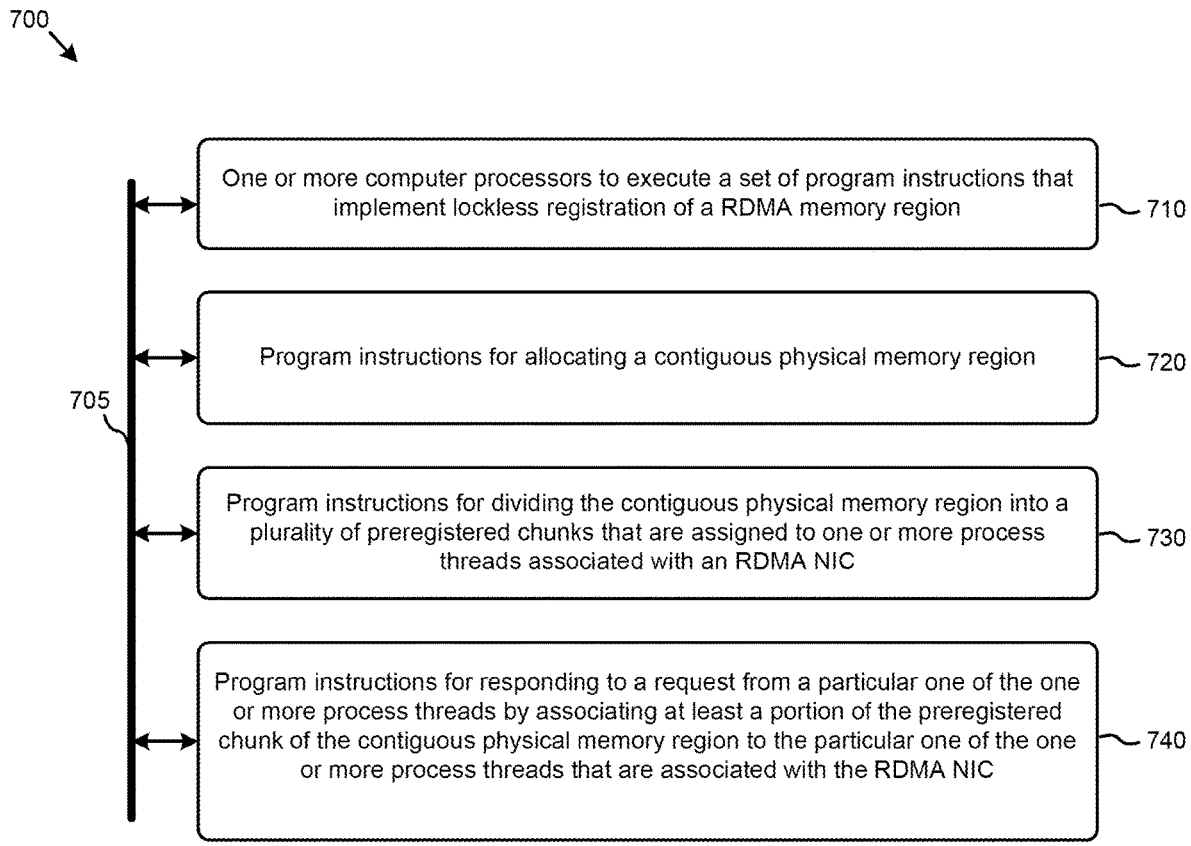
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually or as combined, serve to form improved technological processes that address reducing system performance degradation attributable to lock acquisition and release over constituents of an RDMA buffer pool. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with any other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising one or more computer processors to execute a set of program code instructions (module 710) and modules for accessing memory to hold program code instructions to perform: allocating a contiguous physical memory region (module 720); dividing the contiguous physical memory region into a plurality of preregistered chunks that are assigned to one or more process threads associated with an RDMA NIC (module 730); and responding to a request from a particular one of the one or more process threads by associating at least a portion of the preregistered chunk of the contiguous physical memory region to the particular one of the one or more process threads that are associated with the RDMA NIC (module 740).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

All or portions of any of the foregoing techniques can be partitioned into one or more modules and instanced within, or as, or in conjunction with a virtualized controller in a virtual computing environment. Some example instances within various virtual computing environments are shown and discussed as pertains to FIG. 8A, FIG. 8B, FIG. 8C, and FIG. 8D.

Figure 8A:
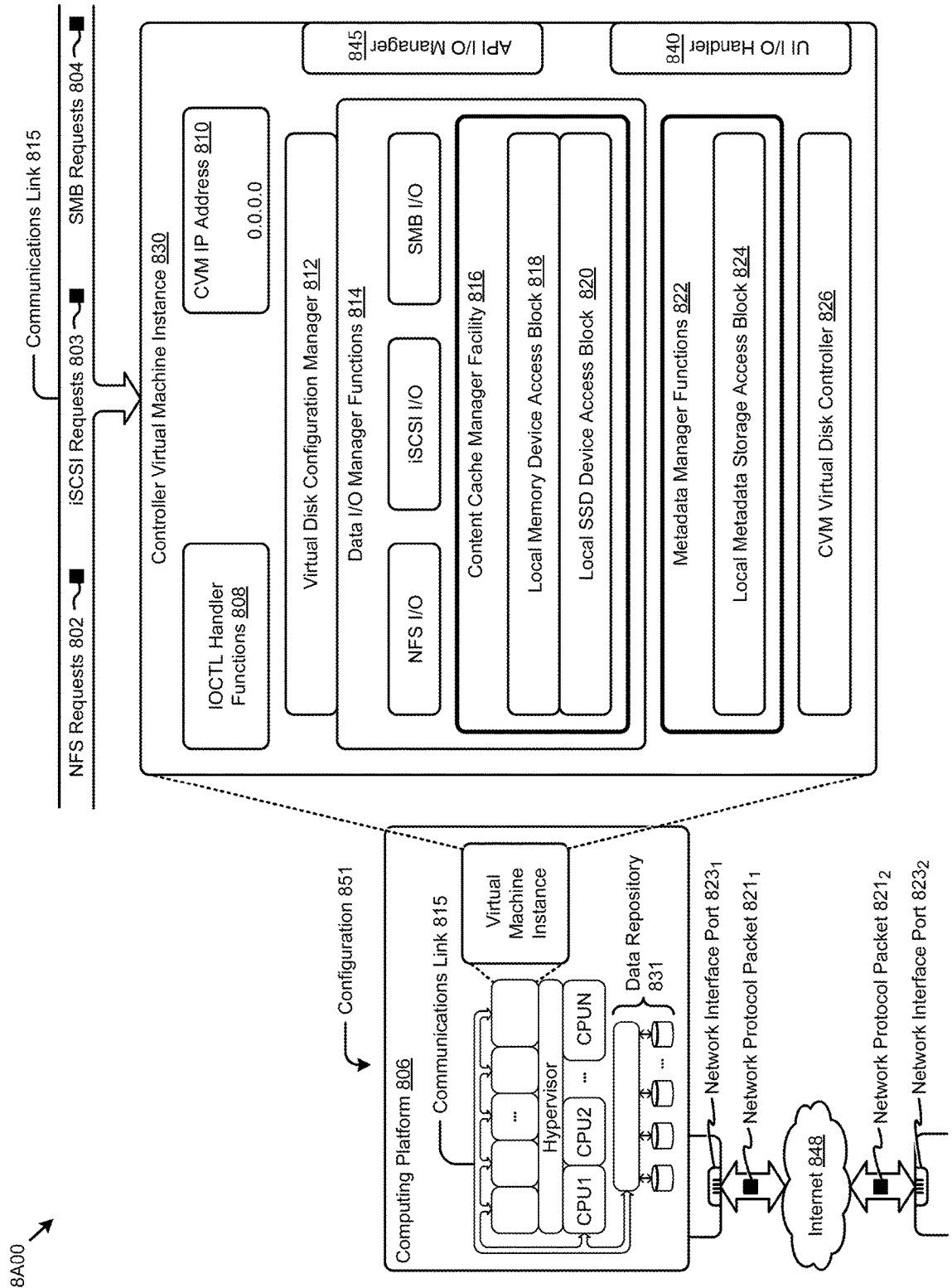
FIG. 8A, FIG. 8B, FIG. 8C, and FIG. 8D depict virtualization system architectures comprising collections of interconnected components suitable for implementing embodiments of the present disclosure and/or for use in the herein-described environments.

FIG. 8A depicts a virtualized controller as implemented in the shown virtual machine architecture 8A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to allocation and caching of preregistered memory regions for use in RDMA I/O operations. In some embodiments, a module may include one or more state machines and/or combinational logic used to implement or facilitate the operational and/or performance characteristics pertaining to allocation and caching of preregistered memory regions for use in RDMA I/O operations.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of allocation and caching of preregistered memory regions for use in RDMA I/O operations). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to allocation and caching of preregistered memory regions for use in RDMA I/O operations, and/or for improving the way data is manipulated when performing computerized operations pertaining to maintaining a global pool of pre-registered RDMA buffers from which individual threads can locklessly obtain memory buffers for RDMA transfers.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 8B:
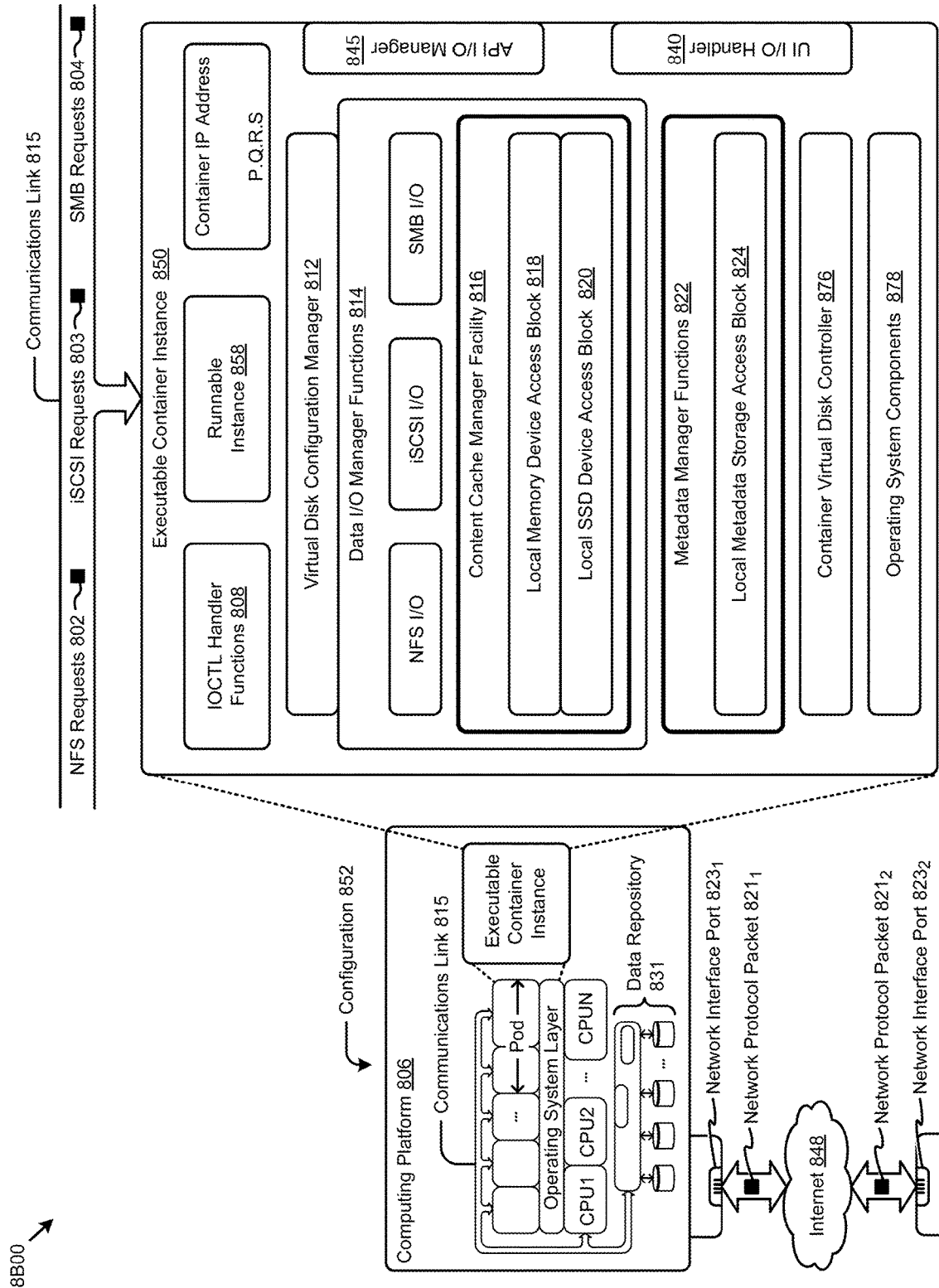

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S" as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls—a," etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
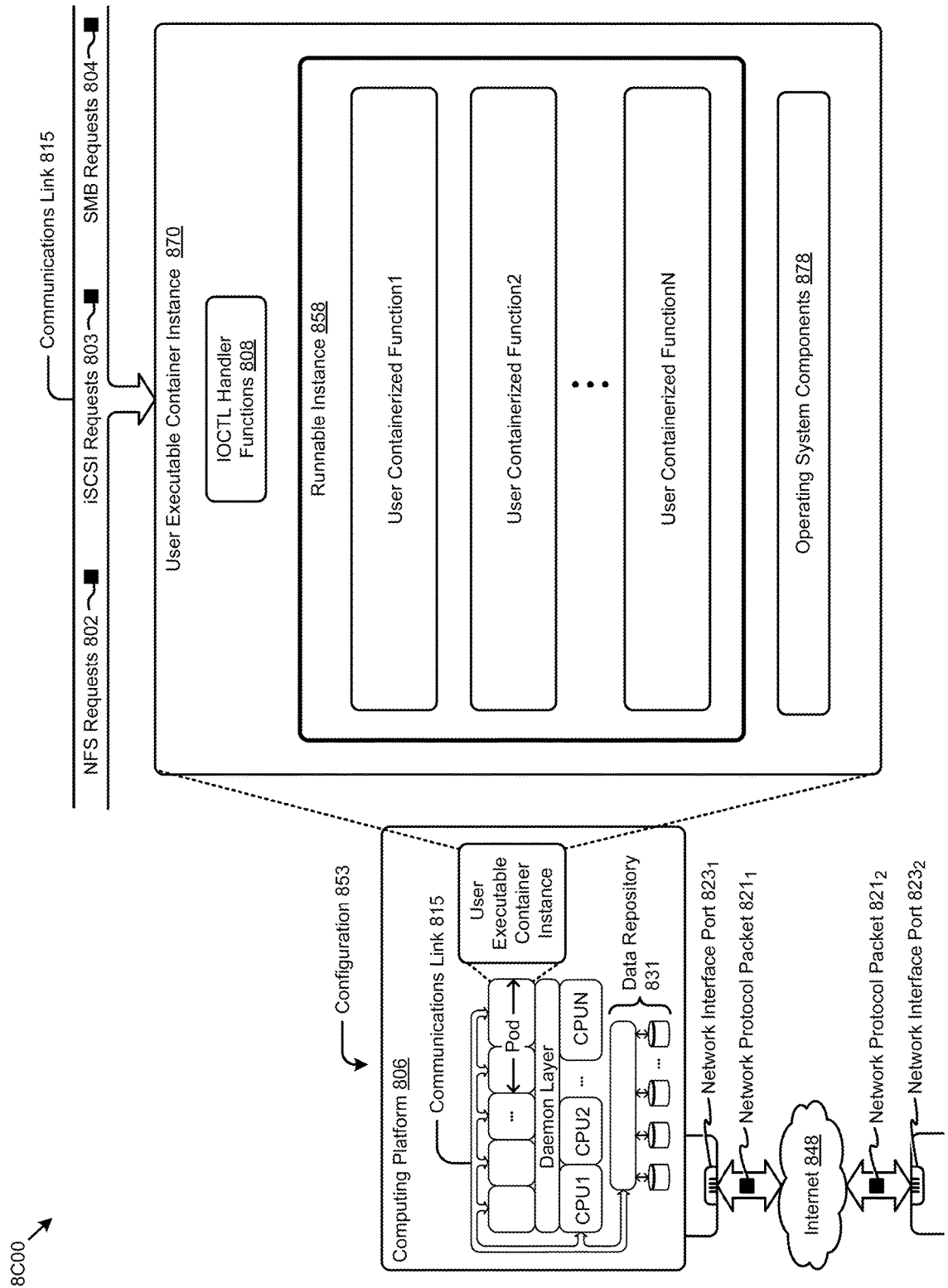

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 870.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM," or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 8D:
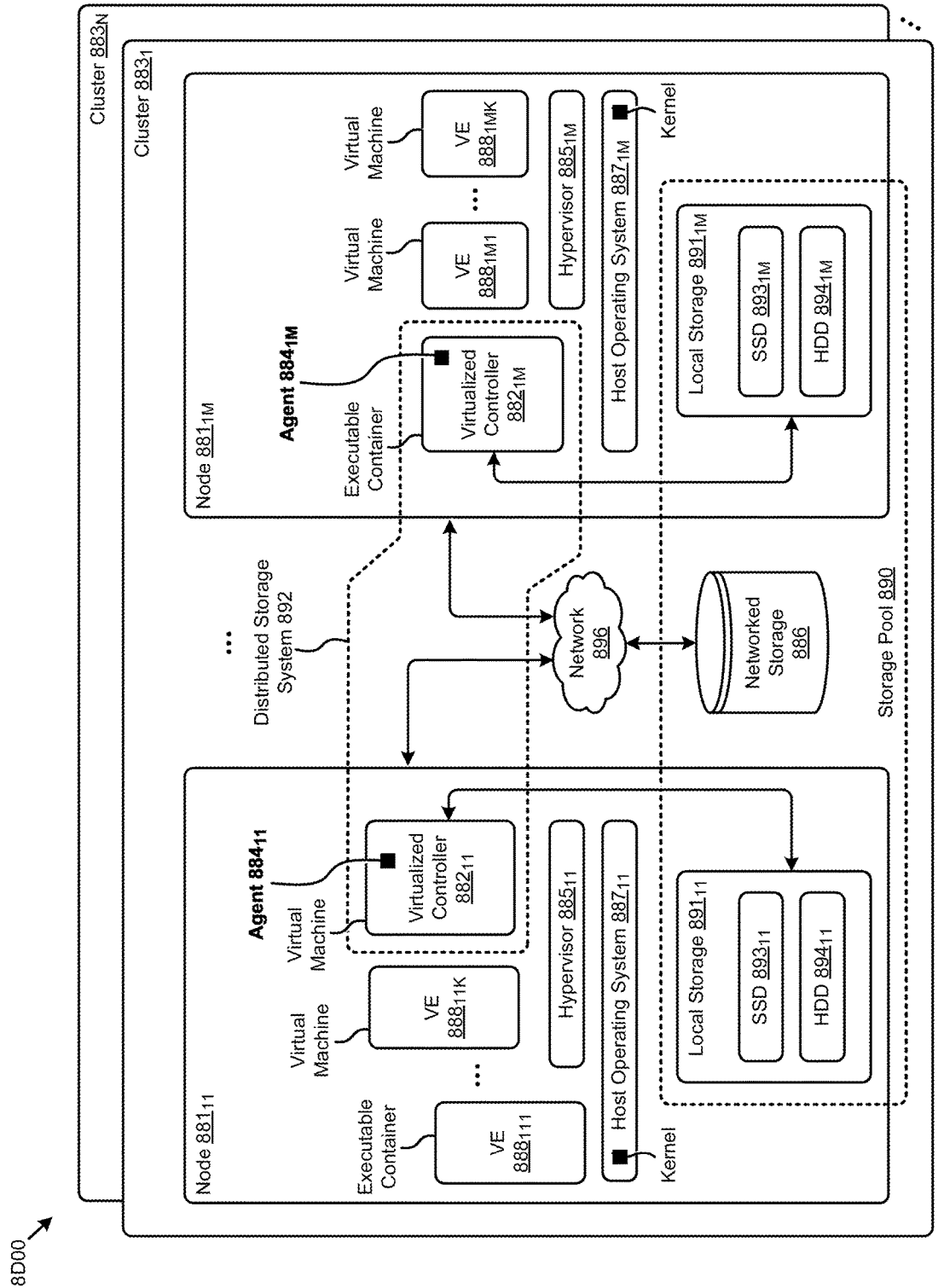

FIG. 8D depicts a distributed virtualization system in a multi-cluster environment 8D00. The shown distributed virtualization system is configured to be used to implement the herein disclosed techniques. Specifically, the distributed virtualization system of FIG. 8D comprises multiple clusters (e.g., cluster $883_1$, . . . , cluster $883_N$) comprising multiple nodes that have multiple tiers of storage in a storage pool. Representative nodes (e.g., node $881_{11}$, . . . , node $881_{1M}$) and storage pool 890 associated with cluster $883_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $891_{11}$, . . . , local storage $891_{1M}$). For example, the local storage can be within or directly attached to a server and/or appliance associated with the nodes. Such local storage can include solid state drives (SSD $893_{11}$, . . . , SSD $893_{1M}$), hard disk drives (HDD $894_{11}$, . . . , HDD $894_{1M}$), and/or other storage devices.

As shown, any of the nodes of the distributed virtualization system can implement one or more user virtualized entities (e.g., VE $888_{111}$, VE $888_{11K}$, VE $888_{1M1}$, VE $888_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $887_{11}$, . . . , host operating system $887_{1M}$), while the VMs run multiple applications on various respective guest operating systems. Such flexibility can be facilitated at least in part by a hypervisor (e.g., hypervisor $885_{11}$, ..., hypervisor $885_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $887_{11}$, ..., host operating system $887_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $881_{11}$ can interface with a controller virtual machine (e.g., virtualized controller $882_{11}$) through hypervisor $885_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $882_{1M}$) in an operating system virtualization environment at a given node. In this case, for example, the virtualized entities at node $881_{1M}$ can access the storage pool 890 by interfacing with a controller container (e.g., virtualized controller $882_{1M}$) through hypervisor $885_{1M}$ and/or the kernel of host operating system $887_{1M}$.

In certain embodiments, one or more instances of an agent can be implemented in the distributed storage system 892 to facilitate the herein disclosed techniques. Specifically, agent $884_{11}$ can be implemented in the virtualized controller $882_{11}$, and agent $884_{1M}$ can be implemented in the virtualized controller $882_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions attendant to maintaining a global pool of pre-registered RDMA buffers from which individual threads can locklessly obtain memory buffers for RDMA transfers can be brought to bear through implementation of any one or more of the foregoing embodiments. Moreover, any aspect or aspects of reducing or eliminating system performance degradation attributable to lock acquisition and release over constituents of an RDMA buffer pool can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause a set of acts comprising:
    before receiving a request for a remote direct memory access (RDMA) memory allocation from a first processing entity, pre-dividing, in response to invocation of a memory register application programming interface (API) call from a hook, a contiguous physical memory region allocated to an RDMA network interface card (NIC) into a plurality of chunks that are pre-assigned to individual processing entities in a non-overlapping manner for lockless buffer allocation, wherein
        a first chunk of the plurality of chunks is assigned to the first processing entity and a second chunk of the plurality of chunks is assigned to a second processing entity,
        assignment of the first chunk to the first processing entity is represented by a first entry in a data structure that maps the contiguous physical memory region to the first chunk and the first processing entity,
        assignment of the second chunk to the second processing entity is represented by a second entry in the data structure that maps the contiguous physical memory region to the second chunk and the second processing entity, and
        the first and second chunks do not overlap;
    receiving the request for the RDMA memory allocation from the first processing entity; and
    locklessly processing the request for the RDMA memory allocation from the first processing entity using the previously assigned first chunk, at least by allocating at least a portion of the previously assigned first chunk to the first processing entity without acquiring a lock.

2. The non-transitory computer readable medium of claim 1, wherein the portion of the previously assigned first chunk comprises a buffer and is allocated in a lockless manner.

3. The non-transitory computer readable medium of claim 1, wherein the contiguous physical memory region is a HugePage contiguous region and the set of acts further comprise dividing the previously assigned first chunk into a plurality of individually allocatable buffers.

4. The non-transitory computer readable medium of claim 1, wherein the contiguous physical memory region is allocated to the RDMA NIC using a system memory allocator, pre-dividing the contiguous physical memory region allocated to the RDMA NIC into the plurality of chunks is executed by a second memory allocator separate from the system memory allocator, and the request for the RDMA memory allocation from the first processing entity is processed by the second memory allocator.

5. The non-transitory computer readable medium of claim 1, wherein registration information is maintained in a mapping table and a lookup operation is performed prior to allocating, to the first processing entity, the portion of the previously assigned first chunk of the contiguous physical memory region assigned to the first processing entity that is associated with the RDMA NIC.

6. The non-transitory computer readable medium of claim 1, wherein the first chunk is divided into a plurality of buffers forming an RDMA buffer pool and respective sizes of the buffers in the RDMA buffer pool is based on a historical buffer payload size demand profile prior to allocating a buffer from the RDMA buffer pool.

7. The non-transitory computer readable medium of claim 1, wherein dividing the contiguous physical memory region into the plurality of chunks is executed asynchronously by a background process initiated in response to the hook, and the background process registers the plurality of chunks with the RDMA NIC.

8. The non-transitory computer readable medium of claim 1, wherein the set of acts further comprise releasing the previously assigned first chunk from assignment to the first processing entity and locklessly assigning the previously assigned first chunk to the second processing entity that is associated with the RDMA NIC.

9. A method comprising:
before receiving a request for a remote direct memory access (RDMA) memory allocation from a first processing entity, pre-dividing, in response to invocation of a memory register application programming interface (API) call from a hook, a contiguous physical memory region allocated to an RDMA network interface card (NIC) into a plurality of chunks that are pre-assigned to individual processing entities in a non-overlapping manner for lockless buffer allocation, wherein
a first chunk of the plurality of chunks is assigned to the first processing entity and a second chunk of the plurality of chunks is assigned to a second processing entity,
assignment of the first chunk to the first processing entity is represented by a first entry in a data structure that maps the contiguous physical memory region to the first chunk and the first processing entity,
assignment of the second chunk to the second processing entity is represented by a second entry in the data structure that maps the contiguous physical memory region to the second chunk and the second processing entity, and
the first and second chunks do not overlap;
receiving the request for the RDMA memory allocation from the first processing entity; and
locklessly processing the request for the RDMA memory allocation from the first processing entity using the previously assigned first chunk, at least by allocating at least a portion of the previously assigned first chunk to the first processing entity without acquiring a lock.

10. The method of claim 9, wherein the portion of the previously assigned first chunk comprises a buffer and is allocated in a lockless manner.

11. The method of claim 9, wherein the contiguous physical memory region is a HugePage contiguous region and further comprises dividing the previously assigned first chunk into a plurality of individually allocatable buffers.

12. The method of claim 9, wherein contiguous physical memory region is allocated to the RDMA NIC using a system memory allocator, pre-dividing the contiguous physical memory region allocated to the RDMA NIC into the plurality of chunks is executed by a second memory allocator separate from the system memory allocator, and the request for the RDMA memory allocation from the first processing entity is processed by the second memory allocator.

13. The method of claim 9, wherein registration information is maintained in a mapping table and a lookup operation is performed prior to allocating, to the first processing entity, the portion of the previously assigned first chunk of the contiguous physical memory region assigned to the first processing entity that is associated with the RDMA NIC.

14. The method of claim 9, wherein the first chunk is divided into a plurality of buffers forming an RDMA buffer pool and respective sizes of the buffers in the RDMA buffer pool is based on a historical buffer payload size demand profile prior to allocating a buffer from the RDMA buffer pool.

15. The method of claim 9, wherein dividing the contiguous physical memory region into the plurality of chunks is executed asynchronously by a background process initiated in response to the hook, and the background process registers the plurality of chunks with the RDMA NIC.

16. The method of claim 9, further comprises releasing the previously assigned first chunk from assignment to the first processing entity and locklessly assigning the previously assigned first chunk to the second processing entity that is associated with the RDMA NIC.

17. A system comprising:
a storage medium having stored thereon a sequence of instructions; and
a processor that executes the sequence of instructions to cause a set of acts comprising,
before receiving a request for a remote direct memory access (RDMA) memory allocation from a first processing entity, pre-dividing, in response to invocation of a memory register application programming interface (API) call from a hook, a contiguous physical memory region allocated to an RDMA network interface card (NIC) into a plurality of chunks that are pre-assigned to individual processing entities in a non-overlapping manner for lockless buffer allocation, wherein
a first chunk of the plurality of chunks is assigned to the first processing entity and a second chunk of the plurality of chunks is assigned to a second processing entity,
assignment of the first chunk to the first processing entity is represented by a first entry in a data structure that maps the contiguous physical memory region to the first chunk and the first processing entity, assignment of the second chunk to the second processing entity is represented by a second entry in the data structure that maps the contiguous physical memory region to the second chunk and the second processing entity, and the first and second chunks do not overlap;

receiving the request for the RDMA memory allocation from the first processing entity; and locklessly processing the request for the RDMA memory allocation from the first processing entity using the previously assigned first chunk, at least by allocating at least a portion of the previously assigned first chunk to the first processing entity without acquiring a lock.

18. The system of claim 17, wherein the portion of the previously assigned first chunk comprises a buffer and is allocated in a lockless manner.

19. The system of claim 17, wherein the contiguous physical memory region is a HugePage contiguous region and the set of acts further comprise dividing the previously assigned first chunk into a plurality of individually allocatable buffers.

20. The system of claim 17, wherein the contiguous physical memory region is allocated to the RDMA NIC using a system memory allocator, pre-dividing the contiguous physical memory region allocated to the RDMA NIC into the plurality of chunks is executed by a second memory allocator separate from the system memory allocator, and the request for the RDMA memory allocation from the first processing entity is processed by the second memory allocator.

21. The system of claim 17, wherein registration information is maintained in a mapping table and a lookup operation is performed prior to allocating, to the first processing entity, the portion of the previously assigned first chunk of the contiguous physical memory region assigned to the first processing entity that is associated with the RDMA NIC.

22. The system of claim 17, wherein the first chunk is divided into a plurality of buffers forming an RDMA buffer pool and respective sizes of the buffers in the RDMA buffer pool is based on a historical buffer payload size demand profile prior to allocating a buffer from the RDMA buffer pool.

23. The system of claim 17, wherein dividing the contiguous physical memory region into the plurality of chunks is executed asynchronously by a background process initiated in response to the hook, and the background process registers the plurality of chunks with the RDMA NIC.

24. The system of claim 17, wherein the set of acts further comprise releasing the previously assigned first chunk from assignment to the first processing entity and locklessly assigning the previously assigned first chunk to the second processing entity that is associated with the RDMA NIC.

* * * * *